US012614348B2

(12) United States Patent
Aljubeh et al.

(10) Patent No.: US 12,614,348 B2
(45) Date of Patent: Apr. 28, 2026

(54) INCREMENTAL SCANNING FOR CUSTOM LANDMARKERS

(71) Applicant: Snap Inc., Santa Monica, CA (US)

(72) Inventors: Marwan Aljubeh, London (GB);
Nursultan Jubatyrov, London (GB);
Eric Nersesian, Summit, NJ (US);
Supannee Tanathong, London (GB)

(73) Assignee: Snap Inc., Santa Monica, CA (US)

( * ) Notice: Subject to any disclaimer, the term of this patent is extended or adjusted under 35 U.S.C. 154(b) by 149 days.

(21) Appl. No.: 18/352,035

(22) Filed: Jul. 13, 2023

(65) Prior Publication Data

US 2024/0020920 A1     Jan. 18, 2024

Related U.S. Application Data

(60) Provisional application No. 63/368,600, filed on Jul. 15, 2022.

(51) Int. Cl.
*G06T 17/00* (2006.01)
*G06T 7/73* (2017.01)
*G06T 19/20* (2011.01)
(52) U.S. Cl.
CPC ................ *G06T 17/00* (2013.01); *G06T 7/74* (2017.01); *G06T 19/20* (2013.01); *G06T 2200/24* (2013.01); *G06T 2207/10028* (2013.01); *G06T 2207/20092* (2013.01); *G06T 2219/2004* (2013.01); *G06T 2219/2016* (2013.01)
(58) Field of Classification Search
None
See application file for complete search history.

(56) References Cited

U.S. PATENT DOCUMENTS 6,009,190 A     12/1999  Szeliski et al.
6,525,731 B1     2/2003  Suits et al.
(Continued)

FOREIGN PATENT DOCUMENTS

CN          113366413          9/2021
CN          118355407  A      7/2024
(Continued)

OTHER PUBLICATIONS

"Landmarker Guide—Lens Studio by Snap Inc.", [Online] Retrieved from the Internet: <URL: https://lensstudio.snapchat.com/templates/landmarker/guide/>, (Dec. 5, 2021), 20 pgs.
(Continued)

*Primary Examiner* — Kyle Zhai
(74) *Attorney, Agent, or Firm* — Schwegman Lundberg & Woessner, P.A.

(57)          ABSTRACT

A method for generating an updated localizer map of a reference scene is provided. The method may include: acquiring a preliminary localizer map of the reference scene, the preliminary localizer map including a preliminary frame that each is associated with a set of preliminary data points; capturing a plurality of new data points on the reference scene; determining poses of the capture device related to the capture of the plurality of new data points; creating at least one new frame; selecting one or more target frames from the preliminary frame and the new frame; and generating the updated localizer map based on the one or more target frames.

14 Claims, 20 Drawing Sheets

(56) References Cited

U.S. PATENT DOCUMENTS

| | | | |
|---|---|---|---|
| 8,438,163 B1 * | 5/2013 | Li | G06F 16/583 |
| | | | 707/706 |
| 9,652,896 B1 | 5/2017 | Jurgenson et al. | |
| 9,984,499 B1 | 5/2018 | Jurgenson et al. | |
| 10,290,049 B1 | 5/2019 | Xu et al. | |
| 10,657,708 B1 | 5/2020 | Jurgenson et al. | |
| 10,810,782 B1 | 10/2020 | Cowburn et al. | |
| 10,997,760 B2 | 5/2021 | Berger et al. | |
| 11,107,255 B2 | 8/2021 | Li et al. | |
| 11,176,737 B2 | 11/2021 | Hare et al. | |
| 12,159,363 B2 | 12/2024 | Aljubeh et al. | |
| 12,462,506 B2 | 11/2025 | Aljubeh et al. | |
| 2004/0095357 A1 | 5/2004 | Oh et al. | |
| 2005/0001852 A1 | 1/2005 | Dengler et al. | |
| 2007/0043616 A1 | 2/2007 | Kutaragi et al. | |
| 2011/0170768 A1 | 7/2011 | Alldrin et al. | |
| 2012/0058782 A1 | 3/2012 | Li | |
| 2012/0195471 A1 | 8/2012 | Newcombe et al. | |
| 2012/0196679 A1 | 8/2012 | Newcombe et al. | |
| 2012/0212509 A1 | 8/2012 | Benko et al. | |
| 2012/0306850 A1 | 12/2012 | Balan et al. | |
| 2013/0044128 A1 | 2/2013 | Liu et al. | |
| 2013/0155058 A1 | 6/2013 | Golparvar-Fard et al. | |
| 2014/0206443 A1 | 7/2014 | Sharp et al. | |
| 2015/0077427 A1 | 3/2015 | Dumitras et al. | |
| 2015/0145865 A1 | 5/2015 | Barnett et al. | |
| 2016/0140757 A1 | 5/2016 | Voth | |
| 2016/0210761 A1 | 7/2016 | Pollefeys et al. | |
| 2016/0266386 A1 | 9/2016 | Scott et al. | |
| 2016/0350833 A1 | 12/2016 | Andon | |
| 2016/0350930 A1 | 12/2016 | Lin et al. | |
| 2016/0371884 A1 | 12/2016 | Benko et al. | |
| 2017/0064360 A1 * | 3/2017 | Houston | H04N 21/23424 |
| 2017/0124713 A1 | 5/2017 | Jurgenson et al. | |
| 2017/0249752 A1 | 8/2017 | Kotake | |
| 2017/0278289 A1 | 9/2017 | Marino et al. | |
| 2018/0005015 A1 | 1/2018 | Hou et al. | |
| 2018/0103209 A1 | 4/2018 | Fischler et al. | |
| 2018/0190032 A1 | 7/2018 | Barnett et al. | |
| 2018/0210628 A1 | 7/2018 | Mcphee et al. | |
| 2018/0246515 A1 | 8/2018 | Iwama et al. | |
| 2019/0028637 A1 | 1/2019 | Kolesov et al. | |
| 2019/0043203 A1 | 2/2019 | Fleishman et al. | |
| 2019/0073832 A1 | 3/2019 | Kim | |
| 2019/0108396 A1 | 4/2019 | Dal Mutto et al. | |
| 2019/0147220 A1 | 5/2019 | Mccormac et al. | |
| 2019/0156534 A1 | 5/2019 | Chen et al. | |
| 2019/0258058 A1 | 8/2019 | Fortin-Deschênes et al. | |
| 2019/0377981 A1 | 12/2019 | Veeravasarapu et al. | |
| 2020/0020118 A1 | 1/2020 | Chapdelaine-Couture et al. | |
| 2020/0111267 A1 | 4/2020 | Stauber et al. | |
| 2020/0126300 A1 | 4/2020 | Song et al. | |
| 2020/0221070 A1 | 7/2020 | Godar | |
| 2020/0250858 A1 | 8/2020 | Li et al. | |
| 2020/0250889 A1 | 8/2020 | Li | |
| 2020/0302681 A1 | 9/2020 | Totty et al. | |
| 2020/0312008 A1 | 10/2020 | Cowburn et al. | |
| 2020/0334824 A1 | 10/2020 | Bleyer et al. | |
| 2020/0368616 A1 | 11/2020 | Delamont | |
| 2021/0012551 A1 | 1/2021 | Cowburn et al. | |
| 2021/0150719 A1 | 5/2021 | Cowburn et al. | |
| 2021/0199460 A1 | 7/2021 | Yerli | |
| 2021/0200776 A1 | 7/2021 | Pounds et al. | |
| 2021/0203727 A1 | 7/2021 | Pounds et al. | |
| 2021/0256765 A1 * | 8/2021 | Huo | G06T 19/006 |
| 2021/0295606 A1 * | 9/2021 | Kim | G06T 17/20 |
| 2021/0334993 A1 | 10/2021 | Woodford | |
| 2021/0343050 A1 | 11/2021 | Li et al. | |
| 2021/0390696 A1 * | 12/2021 | Iwase | G06T 5/60 |
| 2021/0398186 A1 * | 12/2021 | Tang | G06Q 30/0643 |
| 2022/0189108 A1 * | 6/2022 | Shandilya | G06F 18/21 |
| 2022/0239895 A1 * | 7/2022 | Bae | G06T 7/97 |
| 2022/0392167 A1 | 12/2022 | Adkinson et al. | |
| 2023/0177788 A1 | 6/2023 | Aljubeh et al. | |
| 2023/0177789 A1 | 6/2023 | Aljubeh et al. | |
| 2024/0013415 A1 | 1/2024 | Tam et al. | |
| 2025/0046044 A1 | 2/2025 | Aljubeh et al. | |

FOREIGN PATENT DOCUMENTS

| | | | |
|---|---|---|---|
| CN | 119547105 A | 2/2025 | |
| EP | 3846124 | 7/2021 | |
| WO | 2020160245 | 8/2020 | |
| WO | 2020160261 | 8/2020 | |
| WO | 2020205435 | 10/2020 | |
| WO | 2023107932 | 6/2023 | |
| WO | WO-2024015917 A1 | 1/2024 | |

OTHER PUBLICATIONS

"International Application Serial No. PCT/US2022/081002, International Search Report mailed Apr. 13, 2023", 3 pgs.

"International Application Serial No. PCT/US2022/081002, Written Opinion mailed Apr. 13, 2023", 7 pgs.

"International Application Serial No. PCT/US2022/081002, Response to Written Opinion and Article 34 Amendments filed Oct. 5, 2023", 15 pgs.

"Application Serial No. PCT/US2022/081002, Written Opinion Mailed Nov. 16, 2023", 9 pgs.

"International Application Serial No. PCT/US2023/070147, International Search Report mailed Nov. 29, 2023", 5 pgs.

"International Application Serial No. PCT/US2023/070147, Written Opinion mailed Nov. 29, 2023", 6 pgs.

Arefin, Mohammed Safayet, "Effects of a Distracting Background and Focal Switching Distance in an Augmented Reality System", IEEE International Symposium on Mixed and Augmented Reality Adjunct (ISMAR—Adjunct). IEEE ISMAR, (2021), 96-99.

Barde, Amit, "Less is More: Using Spatialized Auditory and Visual Cues for Target Acquisition in a Real-World Search Task", IEEE International Symposium on Mixed and Augmented Reality Adjunct (ISMAR—Adjunct). IEEE ISMAR, (2019), 340-341.

Campbell, John L, "Coding In-depth Semistructured Interviews: Problems of Unitization and Intercoder Reliability and Agreement", Sociological Methods and Research, 42(3), (2013), 294-320.

Chew, W, "Dynamic Strategy of Keyframe Selection with PD Controller for VSLAM Systems", IEEE ASME Transactions On Mechatronics Institute Of Electrical And Electronics Engineers Inc. USA vol. 27, No. 1, (Feb. 1, 2022), 115-125.

Choudhary, Siddharth, "SLAM with Object Discovery, Modeling and Mapping", 2014 IEEE RSJ International Conference on Intelligent Robots and Systems, (2014), 8 pgs.

Czadzeck, Cameron, "Social Media Marketers: Here's Why Augmented Reality Matters", Optic Sky Productions, [Online] Retrieved from the Internet: <URL: https://web.archive.org/web/20211023234742/ https://opticskypro.com/updates/social-media-marketers-heres-why-augmented-reality-matters/>, (Sep. 1, 2021), 8 pgs.

Elgendy, Mohamed, "Deep Learning for Vision Systems", Manning, New York, NY, USA, (2020), 480 pgs.

Feng, Qiaojun, "Localization and Mapping using Instance-specific Mesh Models", 2019 IEEE RSJ International Conference on Intelligent Robots and Systems (IROS), (2019), 7 pgs.

Juichung, Kuo, "Redesigning SLAM for Arbitrary Multi-Camera Systems", arxiv.org, Cornell University Library, 201 Olin Library Cornell University Ithaca, NY 14853, (Mar. 4, 2020), 7 pgs.

Lu, Weiquan, "Subtle Cueing for Visual Search in Augmented Reality", IEEE International Symposium on Mixed and Augmented Reality (ISMAR). IEEE ISMAR, (2012), 161-166.

Reitmayr, Gerhard, "Simultaneous Localization and Mapping for Augmented Reality", 2010 IEEE International Symposium on Ubiquitous Virtual Reality, (Jul. 2010), 5 pgs.

Syiem, Brandon Victor, "Impact of Task on Attentional Tunneling in Handheld Augmented Reality", CHI Conference on Human Factors in Computing Systems (CHI '21), SIGCHI, (2021), 14 pgs.

Wang, Chieh-Chih, "Simultaneous Localization, Mapping and Moving Object Tracking", The International Journal of Robotics Research, 26(9), (2007), 47 pgs.

(56)     References Cited

OTHER PUBLICATIONS

"U.S. Appl. No. 18/062,393, Examiner Interview Summary mailed Jan. 13, 2025", 2 pgs.

"U.S. Appl. No. 18/062,393, Final Office Action mailed Mar. 5, 2025", 10 pgs.

"U.S. Appl. No. 18/062,393, Non Final Office Action mailed Oct. 10, 2024", 10 pgs.

"U.S. Appl. No. 18/062,393, Notice of Allowance mailed Jul. 9, 2025", 10 pgs.

"U.S. Appl. No. 18/062,393, Response filed Jan. 10, 2025 to Non Final Office Action mailed Oct. 10, 2024", 11 pgs.

"U.S. Appl. No. 18/062,393, Response filed Jun. 5, 2025 to Final Office Action mailed Mar. 5, 2025", 9 pgs.

"U.S. Appl. No. 18/062,423, Corrected Notice of Allowability mailed Oct. 3, 2024", 2 pgs.

"U.S. Appl. No. 18/062,423, Corrected Notice of Allowability mailed Oct. 25, 2024", 2 pgs.

"U.S. Appl. No. 18/062,423, Notice of Allowance mailed Jul. 22, 2024", 10 pgs.

"International Application Serial No. PCT/US2022/081002, International Preliminary Report on Patentability mailed Mar. 18, 2024", 11 pgs.

"International Application Serial No. PCT/US2022/081002, Response to Written Opinion filed Jan. 12, 2024", 5 pgs.

"International Application Serial No. PCT/US2023/070147, International Preliminary Report on Patentability mailed Jan. 30, 2025", 8 pgs.

"European Application Serial No. 23754595.9, Response to Communication pursuant to Rules 161 and 162 EPC filed Aug. 25, 2025", 11 pgs.

"Korean Application Serial No. 10-2024-7022565, Voluntary Amendment Filed Aug. 19, 2025", w/ English Claims, 23 pgs.

* cited by examiner

400

406

402

410

408

404

3D point (landmark)

Keyframe (0,0,0) Origin of the model

1500

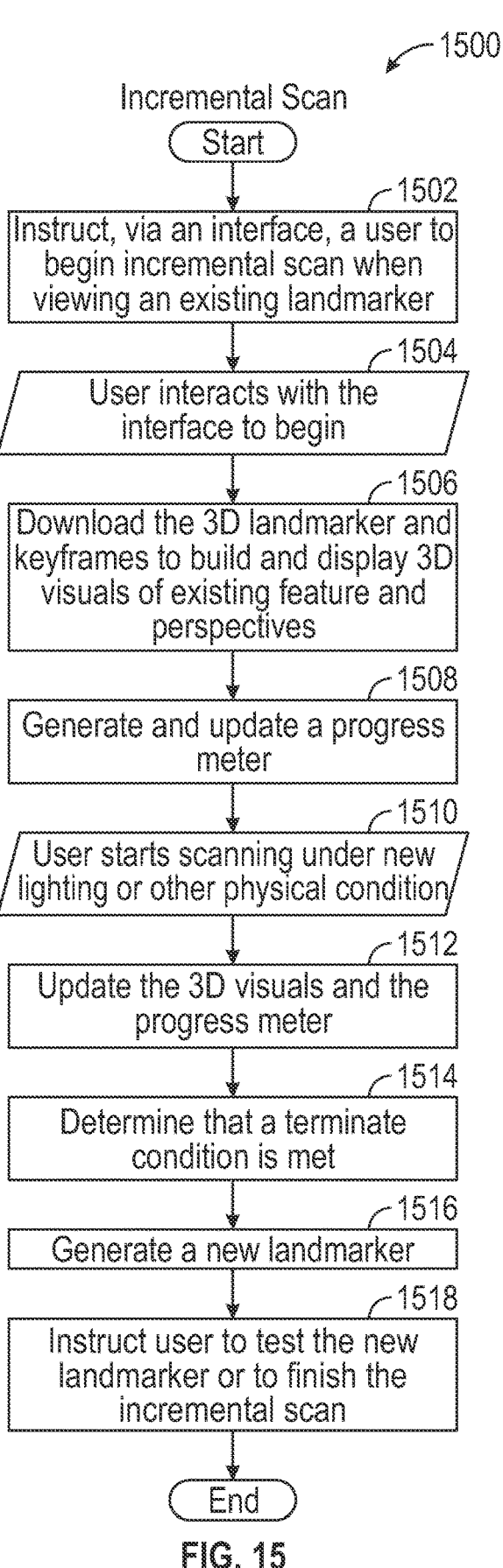

Incremental Scan

Start

1502

Instruct, via an interface, a user to begin incremental scan when viewing an existing landmarker

1504

User interacts with the interface to begin

1506

Download the 3D landmarker and keyframes to build and display 3D visuals of existing feature and perspectives

1508

Generate and update a progress meter

1510

User starts scanning under new lighting or other physical condition

1512

Update the 3D visuals and the progress meter

1514

Determine that a terminate condition is met

1516

Generate a new landmarker

1518

Instruct user to test the new landmarker or to finish the incremental scan

End

FIG. 15

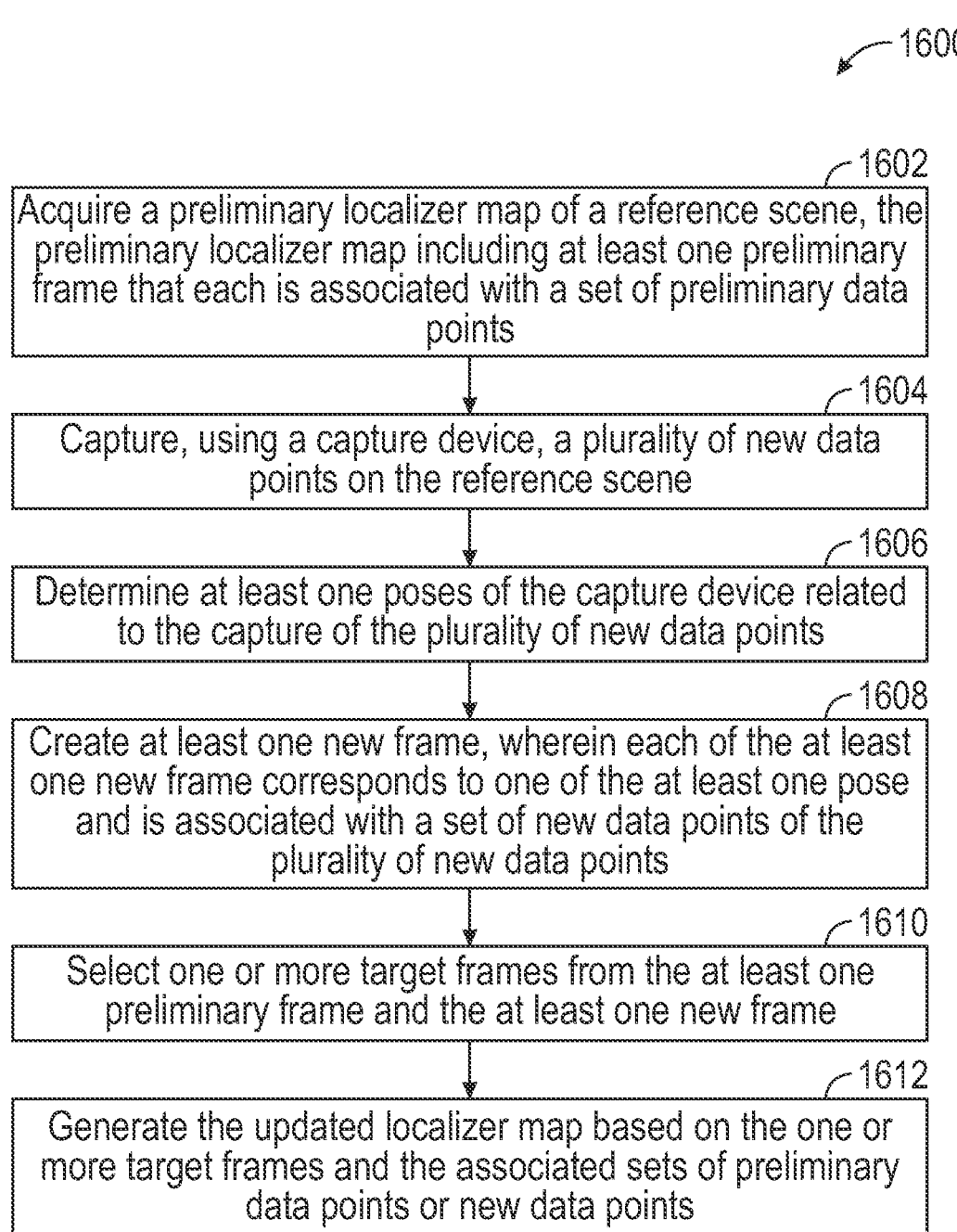

┌─1600

┌─1602
Acquire a preliminary localizer map of a reference scene, the preliminary localizer map including at least one preliminary frame that each is associated with a set of preliminary data points ┌─1604
Capture, using a capture device, a plurality of new data points on the reference scene ┌─1606
Determine at least one poses of the capture device related to the capture of the plurality of new data points ┌─1608
Create at least one new frame, wherein each of the at least one new frame corresponds to one of the at least one pose and is associated with a set of new data points of the plurality of new data points ┌─1610
Select one or more target frames from the at least one preliminary frame and the at least one new frame ┌─1612
Generate the updated localizer map based on the one or more target frames and the associated sets of preliminary data points or new data points

FIG. 16

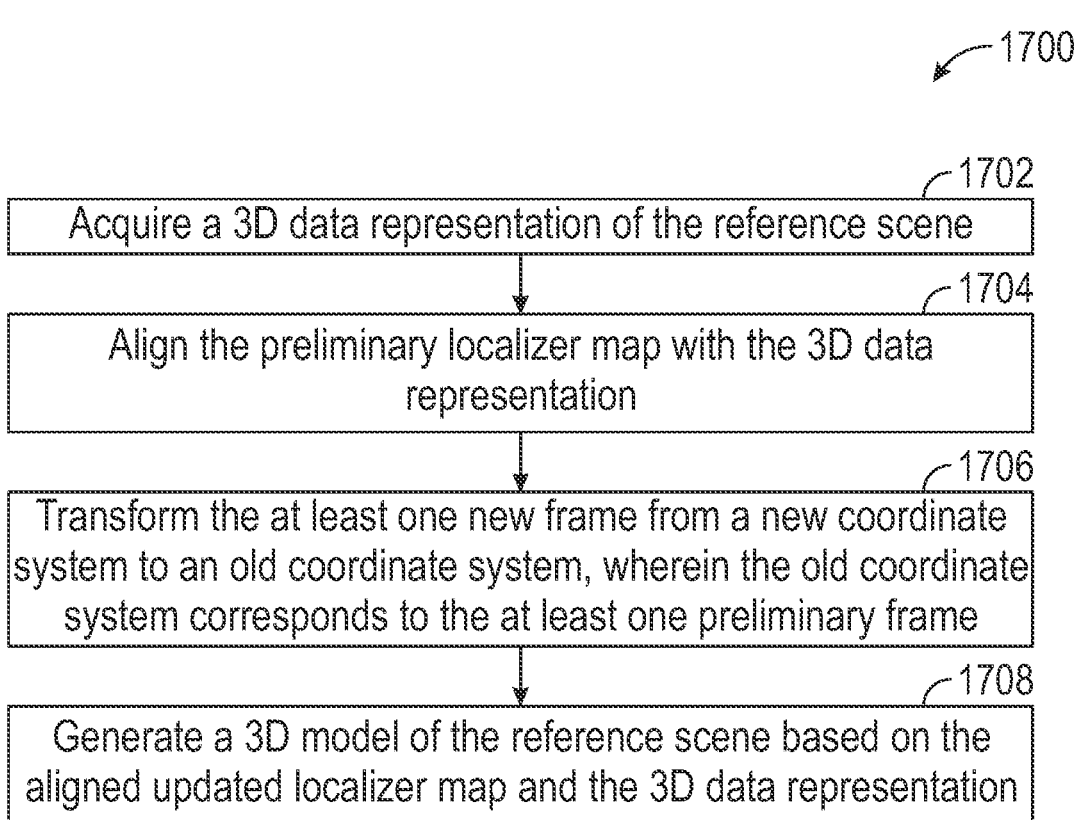

1700

1702
Acquire a 3D data representation of the reference scene

1704
Align the preliminary localizer map with the 3D data representation

1706
Transform the at least one new frame from a new coordinate system to an old coordinate system, wherein the old coordinate system corresponds to the at least one preliminary frame 1708
Generate a 3D model of the reference scene based on the aligned updated localizer map and the 3D data representation

FIG. 17

INCREMENTAL SCANNING FOR CUSTOM LANDMARKERS

CROSS-REFERENCE TO RELATED APPLICATION

This application claims priority from U.S. Provisional Patent Application No. 63/368,600, filed Jul. 15, 2022, and entitled "INCREMENTAL SCANNING FOR CUSTOM LANDMARKERS," which is herein incorporated by reference in its entirety.

BACKGROUND

Augmented reality (AR) may include using computer-generated enhancements to add new information to images in a real-time or near real-time fashion. For example, images of a real-world object on a display of a device may be enhanced with display details that are not present on the object but that are generated by an AR system to appear as if they are on or part of the object. AR systems require a complex mix of image capture information that is integrated and matched with the AR information to be added to a captured scene in a way that seeks to seamlessly present a final image from a perspective determined by the image capture device.

Various technologies may be used in AR rendering, including optical projection systems, monitors, handheld devices, and display systems worn on the human body, such as eyeglasses, contact lenses, or a head-up display (HUD).

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 15 illustrates a flowchart illustrating a method to perform an incremental scan, according to some examples.

FIG. 16 illustrates a flowchart illustrating a method to generate an updated localizer map of a reference scene, according to some examples.

FIG. 17 illustrates a flowchart illustrating a method to align an updated localizer map with preliminary 3D data presentation of a reference scene, according to some examples.

DETAILED DESCRIPTION

In the context of AR (Augmented Reality) technology, an AR landmarker ("landmarker") may refer to a digital representation (e.g., a 3D model) of a physical landmark that is a feature or object in the physical world that is recognized and tracked by an AR system. Landmarkers serve as reference points or anchors for placing virtual content or overlays in the user's augmented reality experience. AR systems typically use computer vision algorithms and sensors, such as cameras, to detect and identify specific landmarkers in the real-world environment. As such, landmarkers can be anything from landmarks, buildings, and signs to everyday objects like tables, chairs, or even people. Once a landmarker is recognized, the AR system can accurately position and align virtual objects or information in relation to the physical world.

Landmarkers play a role in creating immersive and interactive AR experiences. They enable an AR system to understand the user's surroundings and provide relevant virtual content based on the detected landmarker's position, orientation, or other characteristics. This technology may be employed in various AR applications, such as gaming, navigation, education, retail, and industrial training.

Figures 1, 2:
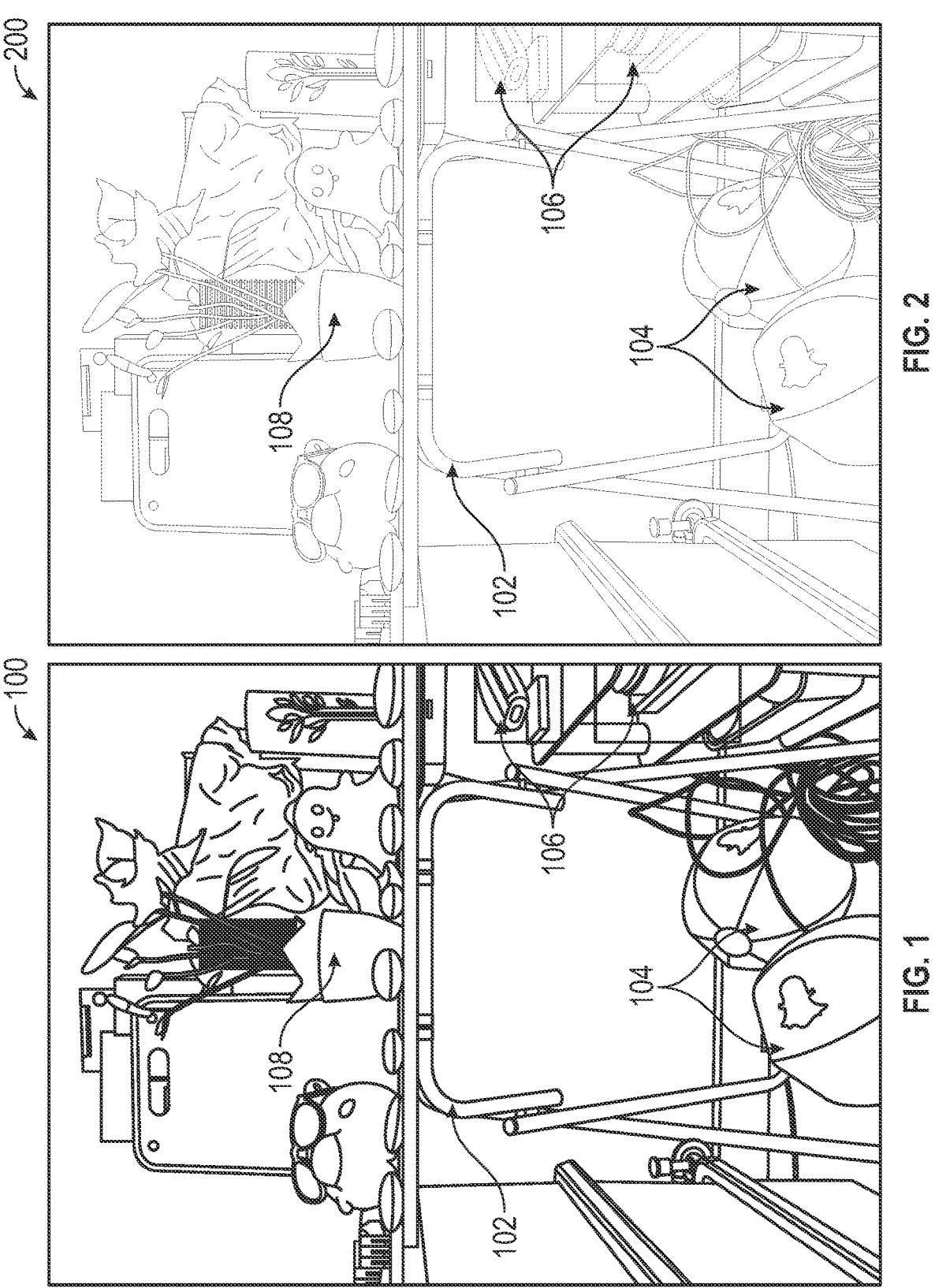
FIGS. 1 and 2 illustrate pictures of a reference scene captured under different lighting conditions, according to some examples.

Examples described herein relate to methods and systems that allow users to update a custom AR landmarker incrementally. Such an update may be particularly useful in these some example scenarios that include:

An AR model is used under different lighting conditions (see, e.g., FIGS. 1 and 2);

The AR model covers a wide range of a reference scene (see, e.g., FIGS. 7 and 8); and The surrounding environment of the reference scene has changed.

For example, consider that a custom AR landmarker built during the daytime is unlikely to localize/track in the night-time, and vice versa. It is desirable to add an ability for custom landmarkers to be able to offer the same AR experiences even under lighting conditions different from when they are created. A user may have built a custom landmarker during the daytime. When the user then revisits the custom landmarker during the nighttime, the user may not be able to get the same AR experience as they do during the daytime. This is because, due to change in lighting, an AR system was unable to determine the position and orientation of the user's capture device with respect to the previously created map. A similar problem occurs when old custom landmarker are used for a wide range on a reference scene or when the surrounding environment of a reference scene has changed, for example, when a piece of indoor furniture has been moved around in the reference scene. It should be noted that the term "reference scene" may refer to an object, a part of an object (e.g., surface), or an environment that contains multiple objects, in examples provided in this disclosure.

The described example incremental landmarker technology offers augmentation or digital effect creators (e.g., "lens" creators) the ability to incrementally update a localizer map to either add a nighttime map to an existing daytime map to support multiple lighting conditions or to expand the localizer map to cover a larger area nearby, etc. An incremental map-building feature, however, can result in the following issues:

1. Too large a map—more than supported by the system;
2. Latency in tracking—especially if there are too many landmarks clustered at the same viewpoints; or
3. Duplicate data—the incremented map may contain too many similar contents.

The examples provided in this disclosure also provide a method of purging frames to be less than a preset number to limit the size of the localizer map. It should be noted that the same or different methods of selecting/purging frames may be used in the above-mentioned different scenarios. It should also be noted that the terms "localizer map" and "sparse map" may be used interchangeably in examples provided in this disclosure.

FIGS. 1 and 2 illustrate pictures of a reference scene captured under different lighting conditions, according to some examples. As shown in FIGS. 1 and 2, pictures 100 and 200 correspond to the same reference scene but were captured under different lighting conditions. For example, picture 100 was captured in the daytime, and picture 200 was captured in the nighttime. The reference scene in pictures 100 and 200 includes a table 102, two balls 104, four containers 106, a plant 108, and other items. Due to changes in lighting conditions, some objects (e.g., the four containers 106) may not be recognizable.

One way to enable AR experiences for any time of the day is to create two separate custom landmarkers (as examples of 3D models): one during daytime and one during nighttime. This may, however, be inconvenient, especially for the lens creators, who would have to create two lenses, one for the day landmarker and the other for the night.

The examples in this disclosure enable a single custom landmarker to offer AR experience at any time of day and in multiple lighting conditions. An example procedure includes: 1. Creating a custom landmarker during a day time—this operation generates a 3D mesh (as an example of a 3D data representation) of the landmarker (e.g., as a reference surface or a reference object) and a localizer map (as an example of a computer vision model, a location tracking data representation) that are suitable to localize and track during the daytime (e.g., the time when it is created); 2. Revisiting the landmarker during dusk time. Check if the landmarker can be localized, then add keyframes (as examples of frames, poses) and 3D points from dusk time to the existing/daytime localizer map. During this operation, the existing 3D mesh may be recreated or left unchanged. 3. Optionally revisiting the landmarker during nighttime and performing the task discussed in 2. but with nighttime data.

In some examples, the old or pre-existing frames in an original localizer map and the new keyframes in dusk time or nighttime make the map size too large. Accordingly, the example systems select/purge one or more target frames from the old frames and new keyframes. The method of selection/purging is described elsewhere in the present disclosure. See, e.g., operation 1610 of method 1600 in FIG. 16. It should be noted that the terms "select" and "purge" may be used interchangeably in the examples provided in this disclosure. For example, a purge of a frame from multiple frames is similar to a selection of other frames from multiple frames.

More specifically, in some examples, as new keyframes are added to a localizer map during incremental updates, the total keyframe count may exceed the maximum size allowed for optimal localization and tracking performance. To prevent the localizer map from becoming too large, a 'keyframe selection' process is used to determine which existing keyframes can be removed without significantly impacting performance.

The keyframe selection process may analyzes each keyframe in the localizer map to determine a 'utility score' indicating how useful it is for localization and tracking. Keyframes with a low utility score may be good candidates for removal. The utility score is calculated based on factors such as:

Timestamp: Keyframes captured further in the past are less likely to represent the current state of the reference scene and receive a lower score. A preset time period, such as 6-12 months, may be used to determine if a keyframe is too old.

Coverage: Keyframes that capture a portion of the reference scene already covered by other, more recent keyframes receive a lower score. The coverage is determined by estimating the 3D area observed in each keyframe.

Quality: Keyframes that are blurry, poorly lit, or otherwise lower quality receive a lower score. Image quality metrics such as sharpness, brightness, and feature detectability are used to determine keyframe quality.

Redundancy: Groups of keyframes observing the same portion of the reference scene from nearly the same device position receive lower scores. The degree of similarity between keyframe views is estimated using feature matching and epipolar geometry.

Based on their utility scores, keyframes are selected for removal until the total keyframe count reaches the maximum allowed. Additional keyframes continue to be removed if adding new keyframes during incremental updates causes the total count to again exceed the maximum.

The keyframe selection process helps ensure useful, high-quality keyframes that provide good coverage of the reference scene are retained in the localizer map. By removing redundant, low-quality or outdated keyframes, the localizer map is kept at a size for fast, accurate localization and tracking.

Figure 3:
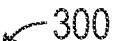
FIG. 3 illustrates a picture of the reference scene captured from a different perspective, according to some examples.

FIG. 3 illustrates a picture of the reference scene captured from a different perspective, according to some examples. The picture 300 may be captured at a common reference scene as picture 100 and 200 but from a broader and higher perspective. Besides the table 102, the balls 104, and the plant 108, a bottle 302 and a balloon 304 are also captured.

Figure 4:
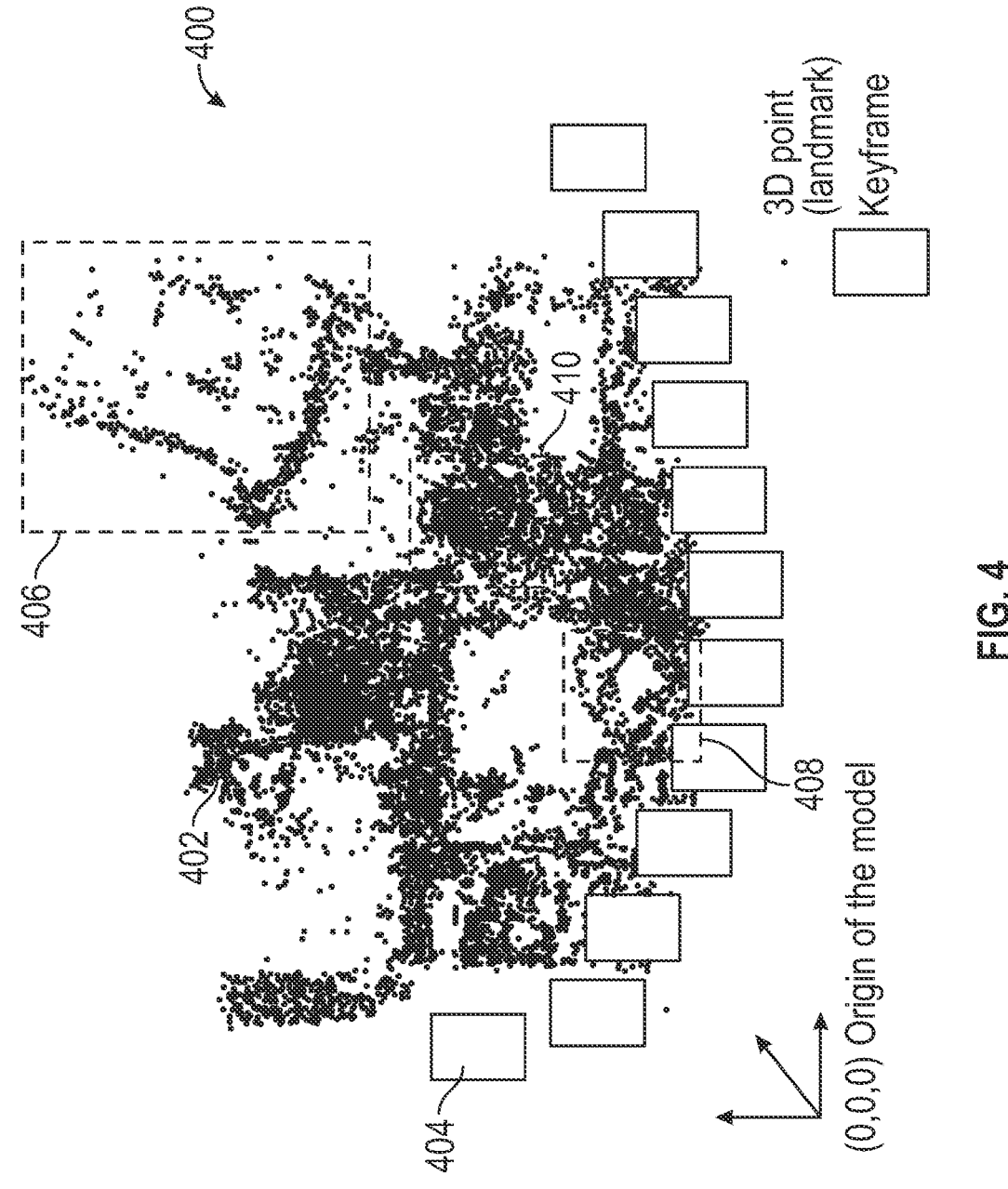
FIG. 4 illustrates a diagram of a sparse map corresponding to the reference scene, according to some examples.

FIG. 4 illustrates a diagram of a localizer map corresponding to the reference scene, according to some examples. As shown in FIG. 4, the sparse map 400 includes multiple 3D sparse points 402 and multiple keyframes 404. The sparse map 400 may correspond to the picture 300 in FIG. 3. A cluster of sparse points 402 in the sparse map 400 may correspond to an object in picture 300. For example, clusters 406, 408, and 410 correspond to balloon 304, bottle 302, and balls 104, respectively.

Each of the keyframes 404 may correspond to a pose (e.g., a position and/or an orientation) of a capture device (e.g., a mobile device) and be associated with a set of the sparse points 402. In some examples, the sparse map 400 in FIG. 4 is created at a first time point t1.

Figure 5:
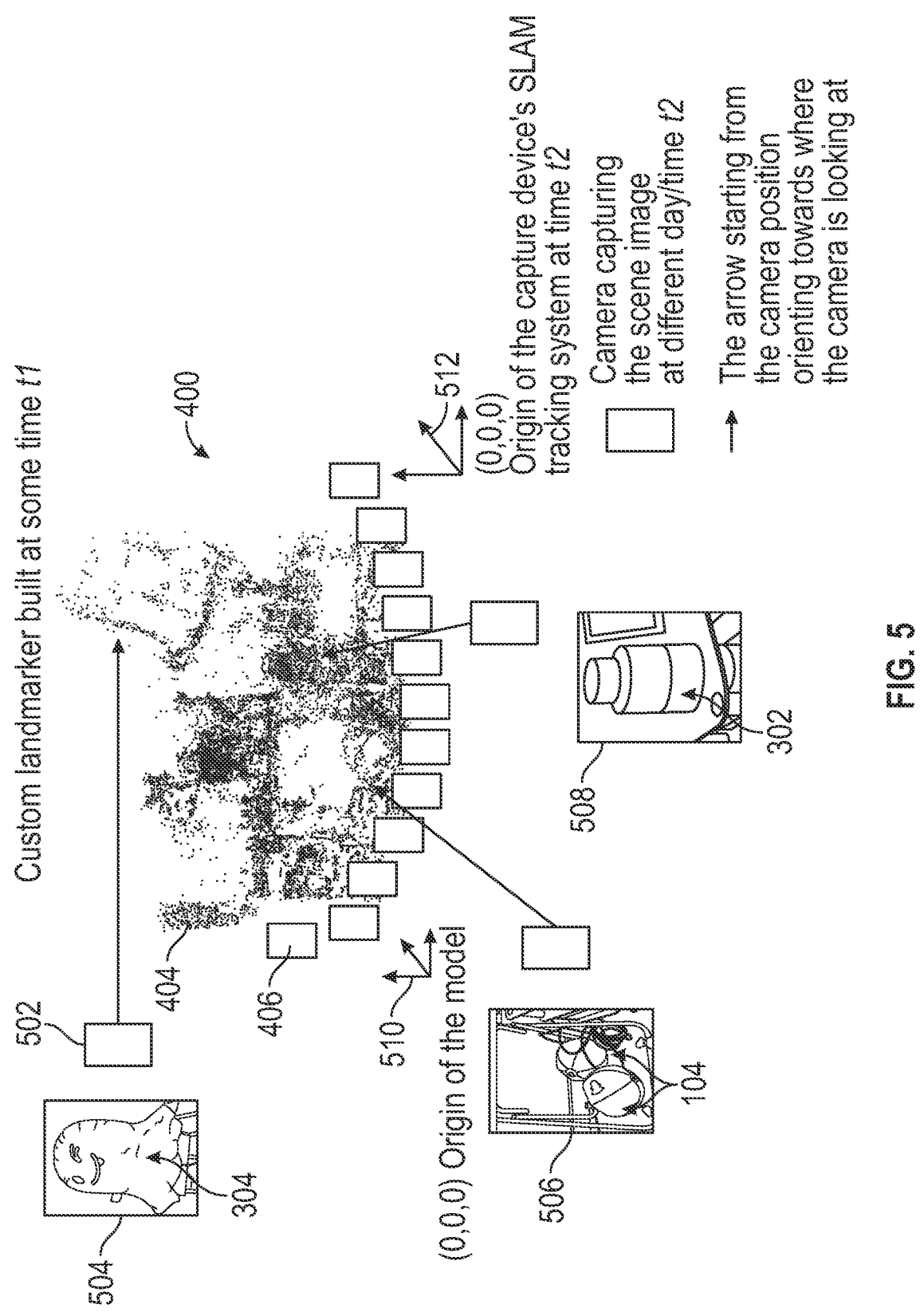
FIG. 5 illustrates a diagram of an old sparse map and a plurality of new frames, according to some examples.

FIG. 5 illustrates a schematic diagram of an old sparse map and a plurality of new frames, according to some examples. As mentioned before, an old sparse map 400, including multiple 3D sparse points 402 and keyframes 404 is created at a first time point t1. At a second time point t2, one or more new keyframes 502 may be captured. Each of the new keyframes 502 includes a position and/or an orientation of a capture device. The pictures 504, 506, and 508 are examples of what are captured by the capture device at the new keyframes 502. For example, the pictures 504, 506, and 508 correspond to balloon 304, balls 104, and bottle 302, respectively. Items in the pictures 504, 506, 508 may look different from them in the picture 300 because the new keyframes 502 are different from the old keyframes 404. However, it shall not be limiting. Some or all of the new keyframes 502 may overlap with the old keyframes 404.

In some examples, the new keyframes 502 have a coordinate system different from the coordinate system of the old keyframes 404 (e.g., the origin 512 of the new coordinate system being different from the origin 510 of the old coordinate system). Accordingly, in order to add information about the new keyframes 502 to the old sparse map 400, the keyframes 502 are transformed from a new coordinate system 512 to an old coordinate system 510. Once a localization model of the landmarker is obtained, a localizer/tracker system (e.g., a Simultaneous Localization And Mapping (SLAM) system, a Natural Feature Tracking (NFT) system) is able to determine the position and the orientation of the camera at the time the image is captured according to a picture of the scene. The transformation of coordinate systems is explained below in detail with the help of FIG. 6.

Figure 6:
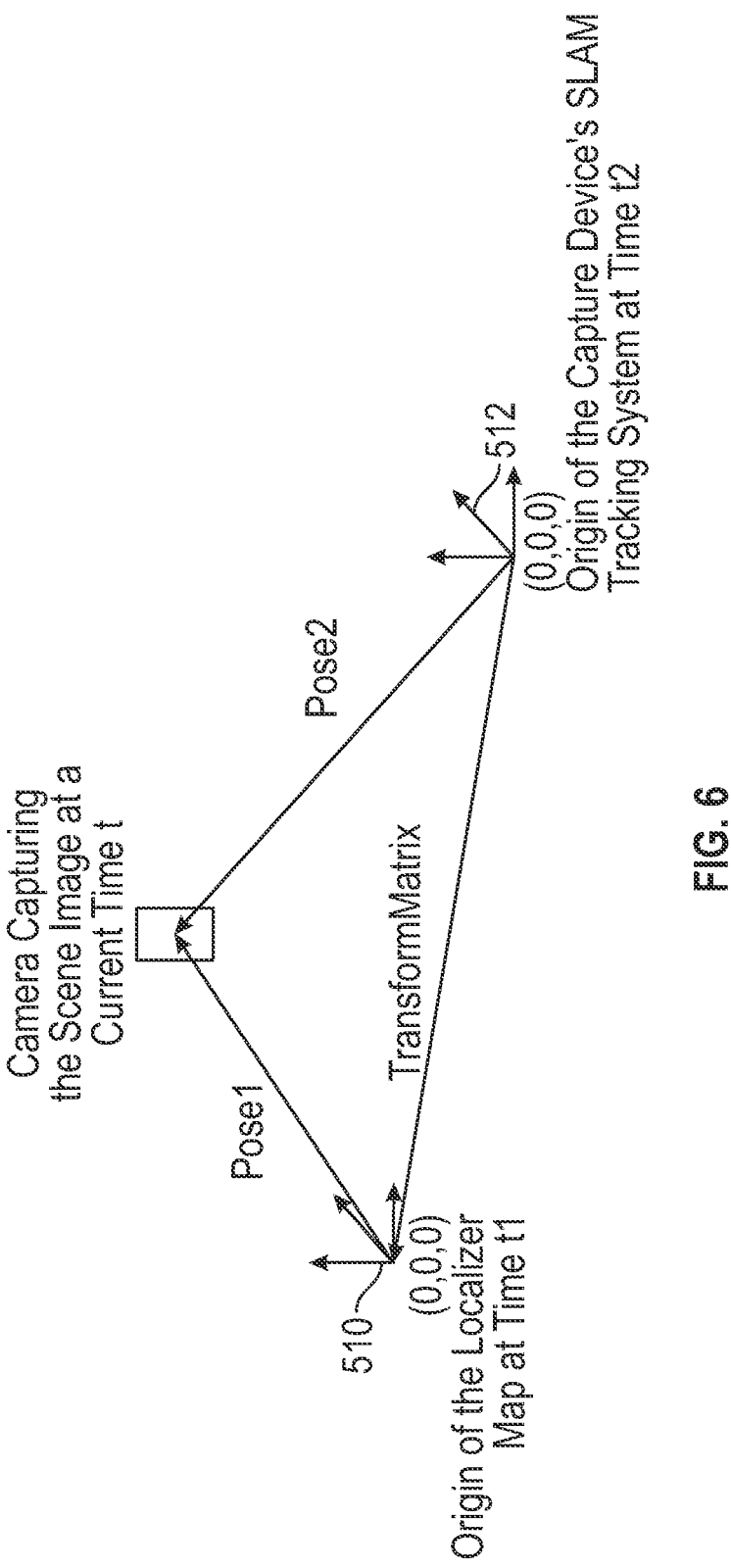
FIG. 6 illustrates a diagram of transforming from a new coordinate system to an old coordinate system, according to some examples.

FIG. 6 illustrates a schematic diagram of transforming from a new coordinate system to an old coordinate system in accordance with some examples. In a 3D Cartesian coordinate system, a point (X, Y, Z) is defined with respect to the origin of the coordinate system (0,0,0). For example, the custom landmarker built at time t1 is defined in its own coordinate system, in which origin 510 (0,0,0) is defined as the origin of its coordinate system. When a user revisits the custom landmarker at a different time t2, with an AR system of the user's capture device turned on, the position and orientation of the user's capture device can also be determined with respect to the AR system (at time t2). If the localizer/tracker can match the features/descriptors in the picture with the features/descriptors in the custom landmarker's localizer model built at time t1, the position, and orientation of the capture device can be determined with respect to the localizer model t1. The pose (e.g., position and orientation) of a camera (for example, the camera capturing the balloon 304) with respect to the AR system (e.g., camera's SLAM tracking system) at time t2 is defined as Pose2. If the same camera is successfully localized with the localizer model t1, its pose with respect to the model's coordinate system is defined as Pose1.

As a result, a relationship between the two coordinate systems Pose1 and Pose2 can be derived because they belong to the same camera but are defined in different coordinate systems. A pose of a camera is composed of a rotation R and a translation vector T, which are defined with reference to a coordinate system. R may be defined as a 3×3 matrix, and T may be defined as a 3×1 matrix. The pose of the camera can be represented as a 4×4 matrix below:

$$\begin{bmatrix} R_{11} & R_{12} & R_{13} & T_1 \\ R_{21} & R_{22} & R_{23} & T_2 \\ R_{31} & R_{32} & R_{33} & T_3 \\ 0 & 0 & 0 & 1 \end{bmatrix}$$

The pose of a camera may be defined as a transformation from the referenced coordinate system to the camera coordinate system. For the above example, Pose1 defines a transformation from the localizer model to the camera, and Pose2 defines a transformation from the AR system to the camera. If a user wishes to compute a transformation from the AR system at time t2 to the localizer model coordinate system at time t1, this can be done by computing a transform between the two as:

$$(Pose_2)^{-1} * Pose_2$$

It should be noted that "transformation of sparse points between two coordinate systems" is used interchangeably in the present disclosure with "aligning the sparse points generated from one coordinate system with the other coordinate system."

Figure 8:
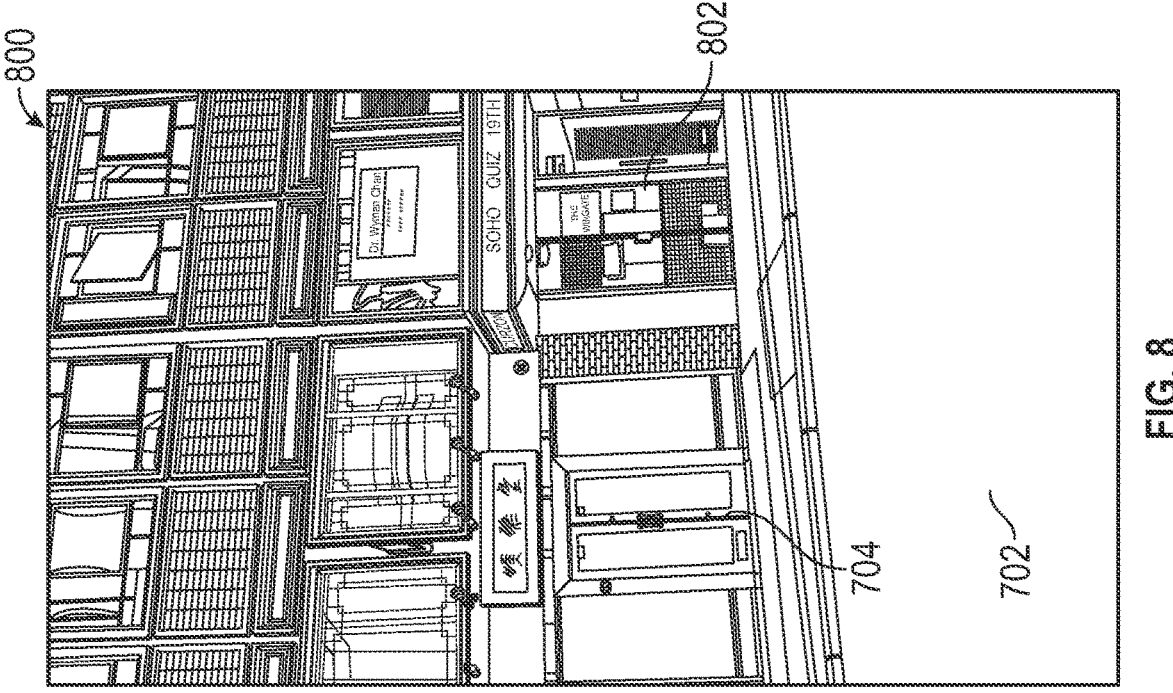
FIGS. 7 and 8 illustrate two pictures that cover different regions of a reference scene, according to some examples.
Figure 7:
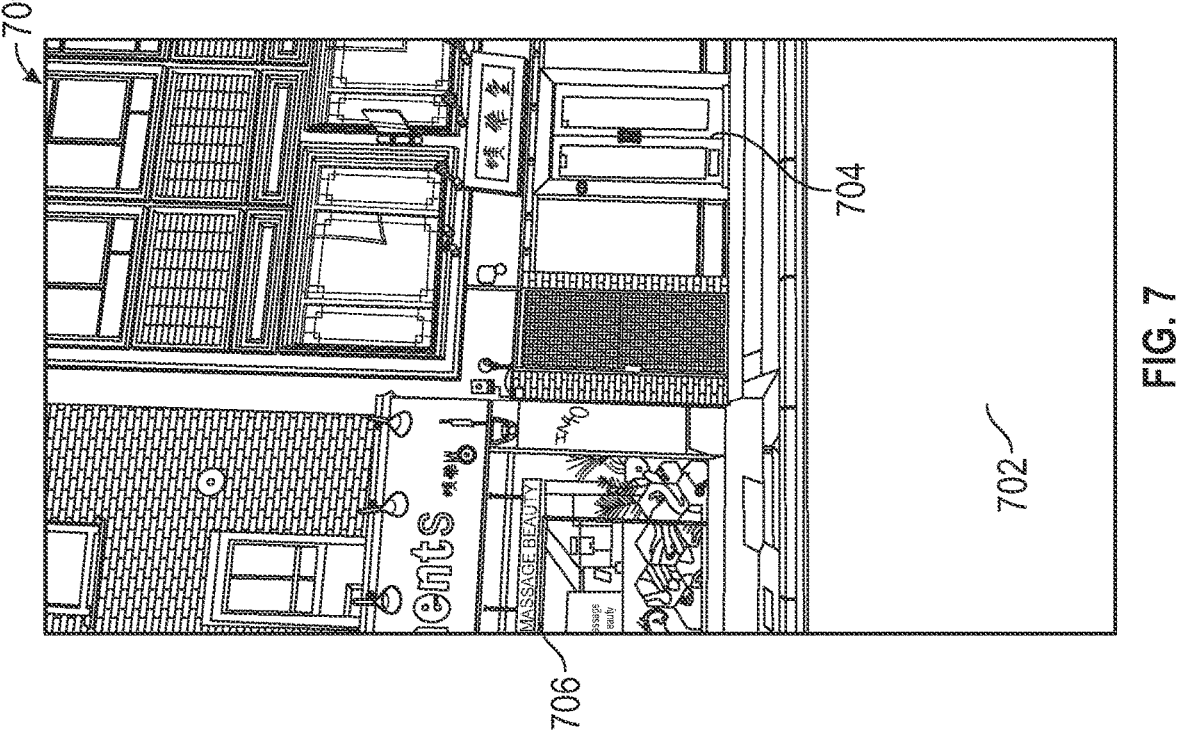

FIGS. 7 and 8 illustrate two pictures that cover different regions of a reference scene, according to some examples. As shown in FIGS. 7 and 8, pictures 700 and 800 are street views of a same street 702. For example, a restaurant 704 appears in both pictures 700 and 800. The picture 700 covers the restaurant 704 and a flower shop 706 on the left of the restaurant 704 and the picture 800 covers the restaurant 704 and an office building 802 on the right of the restaurant 704. In some examples, methods in the disclosure can be used to create a wide localizer map that covers all of the flower shop 706, the restaurant 704, and the office building 802. For example, a pose of a camera when capturing the picture 800 can be determined and transformed to a pose when capturing the picture 700 by the method mentioned above in FIG. 6. A localizer map corresponding to the picture 800 can then be transformed and combined with the localizer map corresponding to the picture 700 to generate a wider localizer map. Details regarding how the pictures 700 and 800 can be used to generate the wider localizer map can be found in FIGS. 9-13 and the descriptions thereof.

Figures 9, 10:
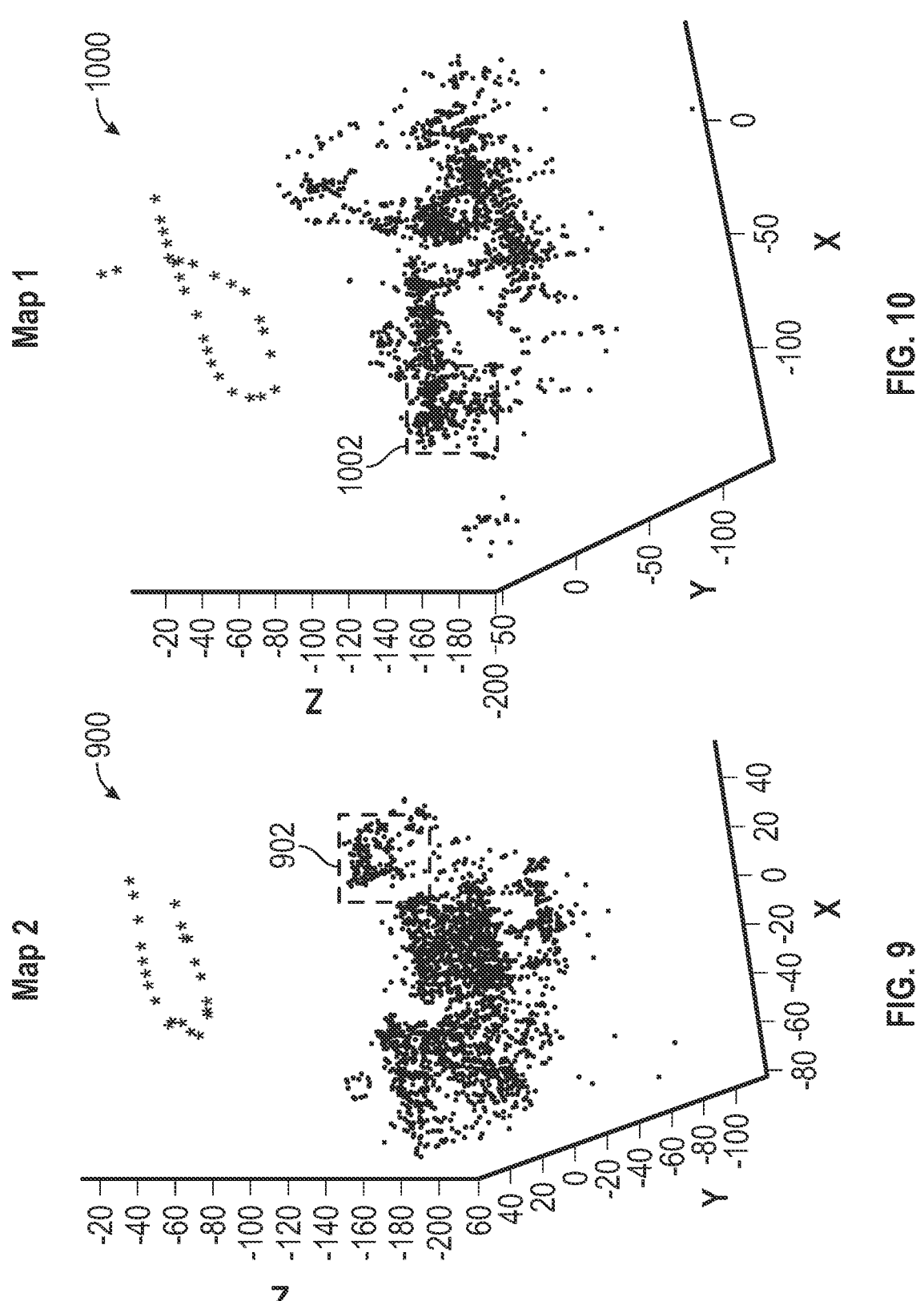
FIGS. 9 and 10 illustrate two sparse maps created corresponding to the reference scene, according to some examples.

FIGS. 9 and 10 illustrate two sparse maps created corresponding to the reference scene, according to some examples. Similar to pictures 700 and 800, which both include the restaurant 704, sparse points 902 in sparse map 900 and sparse point 1002 in sparse map 1000 correspond to the same object, and each of the sparse maps 900 and 1000 covers more items.

Figures 11, 12:
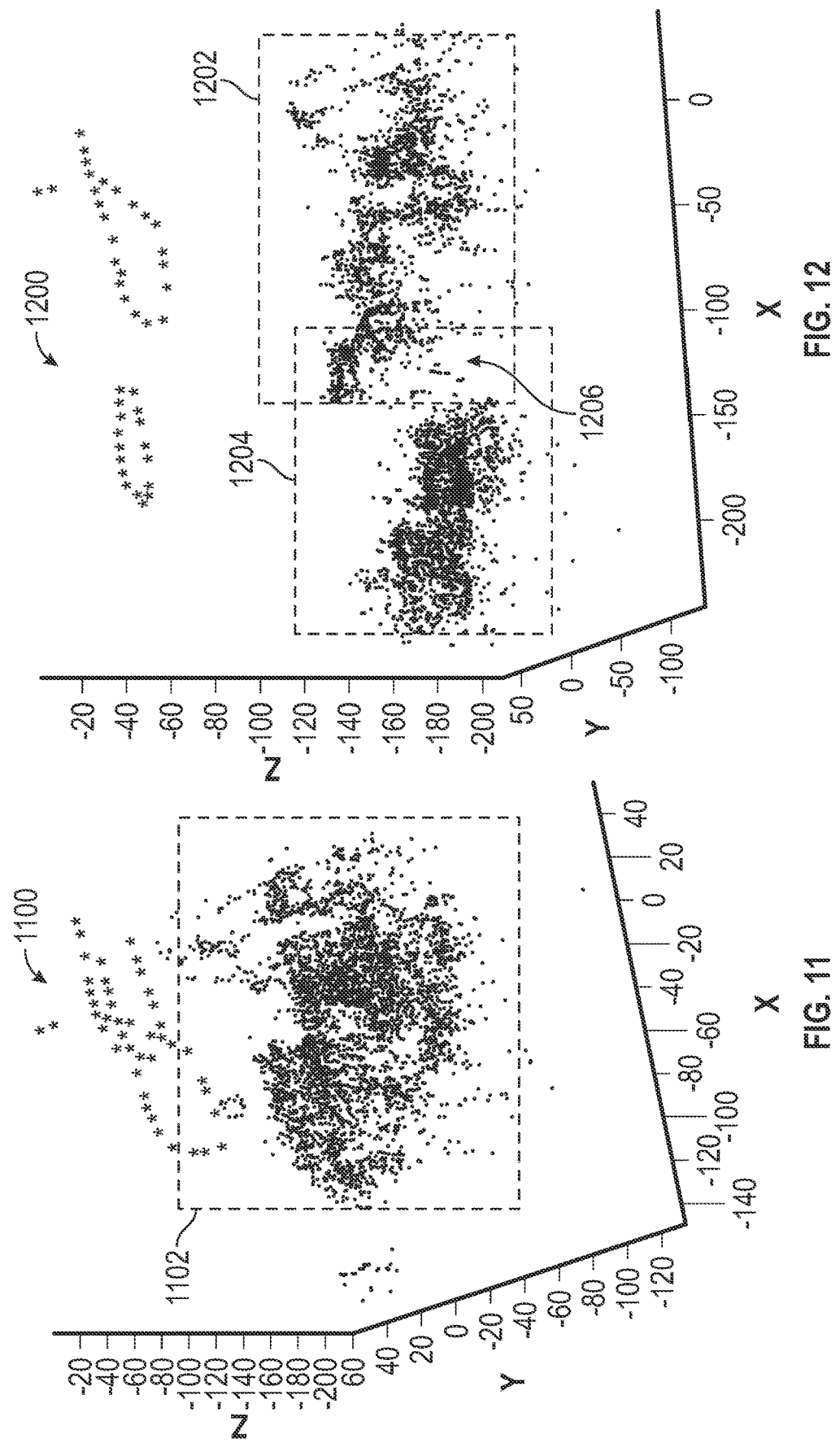
FIGS. 11 and 12 illustrate two updated sparse maps, according to some examples.

FIGS. 11 and 12 illustrate two schematic updated sparse maps, according to some examples. The sparse map 1100 is a direct combination of the sparse maps 900 and 1000 without transformation of coordinate systems. The sparse map 1200 is a combination of the sparse maps 900 and 1000 with a transformation of coordinate systems. The method of transformation of coordinate systems can be found elsewhere in the present disclosure, see, e.g., FIG. 6 and the descriptions thereof. As shown in FIG. 11, sparse points 1102 are mixed and the items that appears in both the sparse maps 900 and 1000 cannot be recognized. In contrast, sparse points in FIG. 12 are more recognizable. For example, sparse points 1202 reflects the sparse map 1000, and the sparse points 1204 reflects the sparse map 900. The overlapped region 1206 includes sparse points that reflect the item which appears in both the sparse maps 900 and 1000.

Figure 13:
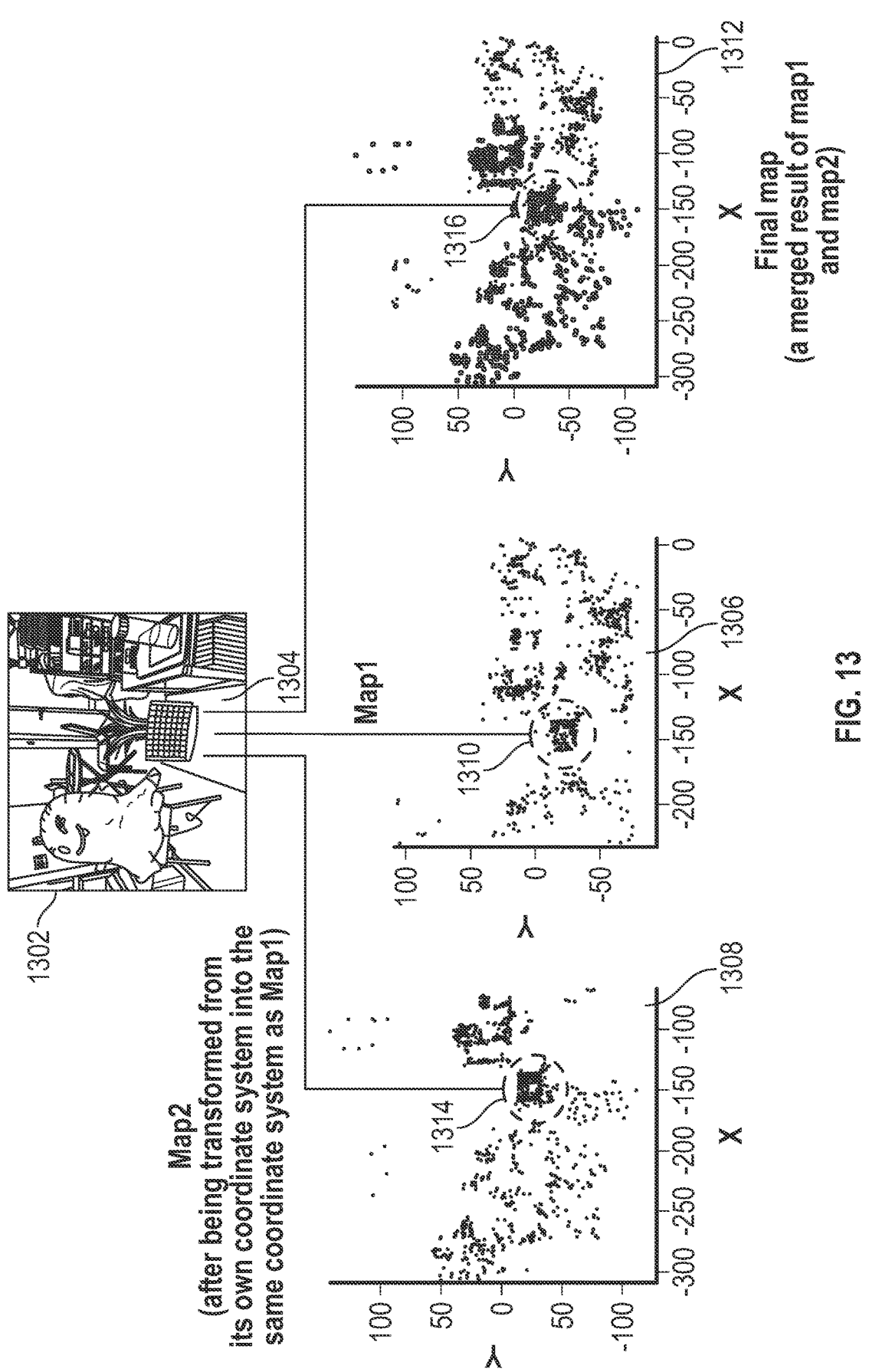
FIG. 13 illustrates a diagram of generating an updated sparse map, according to some examples.

FIG. 13 illustrates a schematic diagram of generating an updated sparse map, according to some examples. As shown in FIG. 13, picture 1302 includes multiple reference scenes, e.g., a balloon, a bottle, a table, a shelf, and a grid plant pot 1304. The sparse maps 1306 and 1308 are generated corresponding to the reference scenes in picture 1302. For example, the sparse points 1310 in sparse map 1306 and sparse points 1314 in sparse map 1308 correspond to the grid plant pot 1304. In some examples, the sparse map 1308 and 1306 are aligned with each other (e.g., by a transformation of coordinate systems) such that the sparse points 1310 and 1314 of the same grid plant pot 1304 overlap (shown collectively as sparse points 1316) in the generated sparse map 1312.

Figure 14:
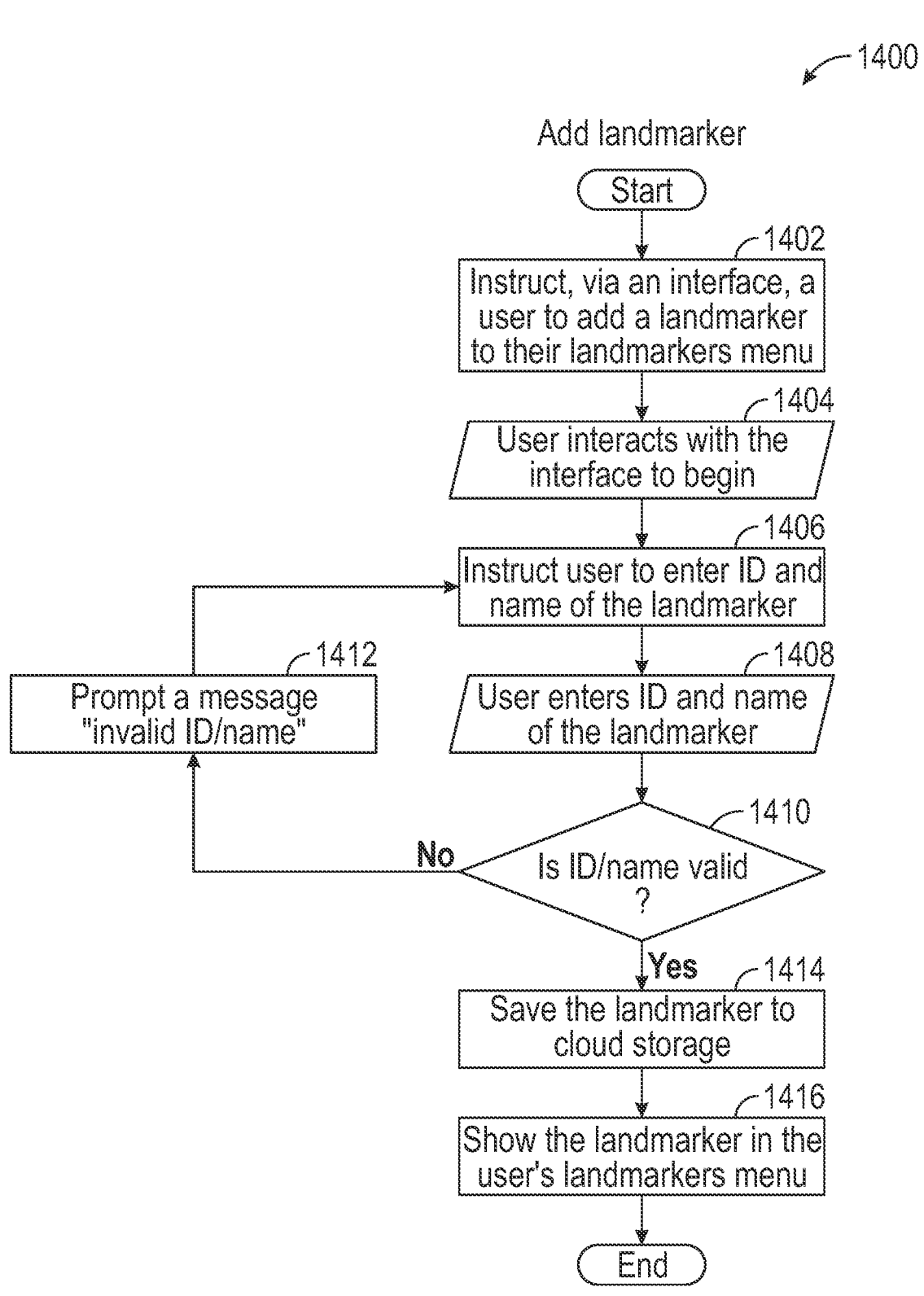
FIG. 14 illustrates a flowchart illustrating a method to add a customer landmarker into a landmarkers menu, according to some examples.

FIG. 14 illustrates a flowchart illustrating a method 1400 to add a customer landmarker into a landmarkers menu, according to some examples. The method 1400 is, in some examples, performed by a creation application, such as scanning utility, studio application, other application 1806, described herein.

In operation 1402, the creation application presents an interface is presented to instruct a user to add a landmarker in their landmarkers menu. The landmarkers menus is a list of landmarkers that the user creates, uploads, or adds.

In operation 1404, the user interacts with the interface to begin to add the landmarker. For example, the interface includes an "add landmarker" button, and the user clicks the "add landmarker" button to begin the remaining operations.

In operation 1406, the creation application presents an interface to instruct the user to enter ID and/or name of the landmarker. The interface may include an input field for the user to enter the ID and/or name.

In operation 1408, the user enters ID and/or name of the landmarker. The ID of the landmarker may be unique and randomly assigned when the landmarker is created and the name of the landmarker is given by the creator of the landmarker.

In operation 1410, the creation application determines whether the ID and/or name is valid. If the ID and/or name is determined to be invalid, the method 1400 proceeds to operation 1412, and a message "invalid ID/name" is prompted; otherwise, the method 1400 proceeds to operation 1414, and the creation application saves the landmarker to a cloud storage. The cloud storage can be a public cloud storage or a private cloud storage. Alternatively, or additionally, the landmarker is locally downloaded to the user's device. In operation 1416, the creation application shows the landmarker in the user's landmarkers menu.

FIG. 15 illustrates a flowchart illustrating a method 1500 to perform an incremental scan, according to some examples. The method 1500 is, in some examples, performed by a creation application, such as scanning utility, studio application, other application 1806, described herein.

In operation 1502, the creation application presents an interface to instruct a user to begin incremental scan when the user is viewing an existing landmarker.

In operation 1504, the user interacts with the interface to begin the incremental scan. In some examples, the interface includes an "incremental scan" button, and the user clicks on the "incremental scan" button to begin the remaining operations.

In operation 1506, the creation application downloads the landmarker and keyframes thereof to build and display 3D visuals of features and perspectives of a reference scene. The 3D visuals may include sparse points and/or 3D meshes.

In operation 1508, the creation application generates a progress meter. The progress meter indicates the progress of incremental scan, e.g., how many sparse points are captured or updated, how many areas in the reference scene are revisited. In some examples, the progress meter is updated during the incremental scan.

In operation 1510, the user starts scanning under new lighting or other physical condition. For example, the user moves around the reference scene to take multiple pictures or videos with their capture device. In operation 1512, the creation application updates the 3D visuals and the progress meter.

In operation 1514, the creation application determines that a terminate condition is met. The terminate condition includes but is not limited to: the progress meter reaches a threshold value, a terminate instruction is received from the user, a time duration is passed, a count of total or new sparse points collected reaches a threshold value, a count of new keyframes generated reaches a threshold value.

In operation 1516, the creation application generates a new landmarker (or updated landmarker) based on the updated 3D visuals. In operation 1518, the creation application presents an interface to instruct user to test the new landmarker or to finish the incremental scan.

The user experience may include the following:

A user may wish to incrementally update an existing custom landmarker, comprising a 3D model and localizer map, by capturing new keyframes and 3D points under different conditions. The user launches the custom landmarker creation application and views their list of existing custom landmarkers. The user selects the custom landmarker they want to update by entering its ID. Note that the user updating the custom landmarker does not have to be the same user that originally created it.

A custom landmarker creation application prompts the user to capture new data for the selected custom landmarker in order to begin the incremental update process. The user is first asked to localize their capture device, such as a camera, with respect to the existing custom landmarker. This initializes the application to the correct position and orientation so new keyframes and 3D points can be properly aligned. Localization is performed by detecting sparse points in the current camera image and matching them to the sparse points in the existing localizer map.

Once localized, the existing 3D mesh for the custom landmarker is displayed to the user for confirmation that it appears correctly aligned. The user has the option to create a new 3D mesh for the custom landmarker, which would replace the existing mesh, or keep the existing mesh unchanged.

The application then prompts the user to specify the lighting conditions for capturing the new data, such as good, poor, or none. The user can then begin capturing new keyframes by moving around the reference scene and capturing images or video. As new keyframes are captured, the pose of the capture device is determined for each keyframe. 3D points are detected in each new keyframe and matched to determine their 3D position. The new keyframes and 3D points are added to the localizer map, and the 3D mesh may be recreated or left unchanged.

During incremental updates to a custom landmarker, a decision may be made whether to reuse the existing 3D model (e.g. 3D mesh) or generate a new 3D model from the latest keyframes and 3D points. Reusing the existing 3D model may be more efficient, while generating a new 3D model may produce a higher quality result. The approach taken depends on an analysis of the existing 3D model and latest keyframes.

The existing 3D model is suitable for reuse if:

It was generated from keyframes capturing the reference scene under similar conditions (e.g., same lighting and environment) as the latest keyframes. This indicates the 3D model is still an accurate representation of the reference scene.

A comparison of sparse points from the latest keyframes to the 3D model shows minimal deviation. Small deviations indicate the geometry of the reference scene has not changed significantly. Large deviations indicate the 3D model needs updating.

The latest keyframes do not observe any new portions of the reference scene not covered in the existing 3D model. If new areas are observed, the 3D model needs to be expanded.

If the above conditions are met, the existing 3D model can be reused as-is. The latest keyframes are aligned to the 3D model but do not require any changes to the model geometry. This approach is the most efficient since the 3D model does not need to be recreated.

However, a new 3D model may be generated if:

The latest keyframes were captured under very different conditions from those used to generate the existing 3D model. For example, an existing daytime 3D model will not accurately represent nighttime keyframes.

There are large deviations between sparse points in the latest keyframes and the existing 3D model, indicating significant changes to the reference scene geometry.

The latest keyframes observe new portions of the reference scene not covered in the existing 3D model. The 3D model needs to be expanded to include these new areas.

Generating a new 3D model from the latest aligned keyframes and 3D points produces the highest quality result at the cost of additional processing time. The new 3D model may be well-suited to the current state of the reference scene.

When the user has finished capturing new data, they indicate they are done scanning. The updated custom landmarker, comprising the updated localizer map and potentially a new 3D mesh, can then be tested to confirm it localizes correctly, even under the new conditions. If satisfied with the results, the user can publish the updated custom landmarker. The updated custom landmarker is automatically starred so the user can easily revisit and test it again.

The incremental update process allows a single custom landmarker to be improved over time by capturing new keyframes and 3D points under different conditions. This provides an efficient way for custom landmarkers to continue offering high-quality augmented reality experiences as conditions change or more areas are covered.

FIG. 16 illustrates a flowchart illustrating a method 1600 to generate an updated localizer map of a reference scene, according to some examples. The method 1600 is, in some examples, performed by a creation application, such as scanning utility, studio application, other application 1806, described herein.

In operation 1602, the creation application acquires a preliminary sparse map of a reference scene, the preliminary sparse map including at least one preliminary keyframe that each is associated with a set of preliminary sparse points.

In operation 1604, the creation application instructs a user to capture, using a capture device, multiple new sparse points on the reference scene. In some examples, the new sparse points are captured at a different time, under a different lighting condition and/or cover a different range.

In operation 1606, the creation application determines at least one pose (e.g., position and orientation) of the capture device related to the capture of the plurality of new sparse points.

In operation 1608, the creation application creates at least one new keyframe, wherein each of the at least one new keyframe corresponds to one of the at least one pose and is associated with a set of new sparse points of the multiple new sparse points.

In operation 1610, the creation application selects one or more target frames from the at least one preliminary frame and the at least one new frame. In some examples, after determining that a count of the selected one or more target frames exceeds a maximum number of frames, the creation application purges a target frame from the one or more selected target frames such that the count of the selected target frames after purging is less than or equal to the maximum number of frames.

The one or more target frames may be randomly selected from the at least one preliminary frame and the at least one new frame. Alternatively, the selection of the one or more target frames may include: determining a timestamp corresponding to each of the at least one preliminary frame; removing an old preliminary frame from the at least one preliminary frame to generate one or more remaining preliminary frames, wherein the timestamp of the old frame is earlier than a preset time point; and selecting the one or more target frames from the one or more remaining preliminary frames and the at least one new frame.

In some examples, operation 1610 includes: clustering the at least one preliminary frame and the at least one new frame to generate one or more target clusters; and selecting at least one target frame from each of the one or more target clusters as the one or more target frames. More specifically, there may be an isolated target cluster among the one or more target clusters, wherein the count of frames in the isolated target cluster is less than a threshold. The operation 1610 may further include removing the isolated target cluster from the one or more target clusters to generate at least one remaining target cluster; and selecting the at least one target frame from each of the at least one remaining target cluster as the one or more target frames.

In some examples, operation 1610 includes: displaying a visual representation related to the at least one preliminary frame and the at least one new frame on a graphical user interface (GUI) of a user device; receiving a selecting operation on the GUI from a user; and selecting the one or more target frames based on the selecting operation from the user. Additionally, or alternatively, operation 1610 includes determining a quality index for each of the at least one preliminary frame and each of the at least one new frame; and selecting the one or more target frames from the at least one preliminary frame and the at least one new frame based on the quality index.

In operation 1612, the creation application generates an updated localizer map based on the one or more target frames and the associated sets of preliminary data points or new data points.

FIG. 17 illustrates a flowchart illustrating a method 1700 to align an updated localizer map with preliminary 3D data presentation of a reference scene, according to some examples. The method 1700 is, in some examples, performed by a creation application, such as scanning utility, studio application, other application 1806, described herein.

In operation 1702, the creation application acquires a preliminary 3D data representation (e.g., 3D meshes) of the reference scene. In operation 1704, the creation application aligns the preliminary localizer map with the preliminary 3D data representation. In operation 1706, the creation application transforms the at least one new frame from a new coordinate system to an old coordinate system, wherein the old coordinate system corresponds to at least one preliminary frame in the preliminary localizer map. In operation 1708, the creation application generates a 3D model of the reference scene based on the updated localizer map and the preliminary 3D data representation.

Example Alignment Process:

When a user performs an incremental update to an existing custom landmarker, new keyframes and 3D points are captured from the reference scene. These new keyframes and 3D points are initially in the coordinate system of the capture device, referred to as the 'new coordinate system.' The existing localizer map for the custom landmarker has keyframes and 3D points in its own 'old coordinate system.'

To add the new keyframes and 3D points to the existing localizer map, they may be transformed from the new coordinate system to the old coordinate system. This is done through a process known as 'coordinate system alignment' or 'spatial alignment.'

The alignment process begins by detecting sparse points, such as corners or edges, that are common between at least one new keyframe and one existing keyframe in the localizer map. The positions of these common sparse points in both the new and old coordinate systems are used to calculate a spatial transformation, such as a rigid transformation, between the two coordinate systems.

The spatial transformation is then applied to all new keyframes and 3D points to convert their positions to the old coordinate system. The transformed new keyframes and 3D points can then be added to the existing localizer map, with all data now in a common coordinate system.

With all keyframes and 3D points in the same coordinate system, the updated localizer map functions properly for localization and tracking. The capture device position and orientation can be accurately determined with respect to the reference scene by detecting sparse points in the current view and matching them to sparse points in keyframes from either the original localizer map or the incremental update.

The alignment process allows incremental updates to build on an existing localizer map rather than requiring an entirely new map to be generated from scratch. Over multiple updates, a single localizer map accumulates keyframes and 3D points from varying conditions, improving its ability to handle changes in lighting, environment or device position. The end result is a custom landmarker that continues providing high quality experiences even as the reference scene evolves over time.

Networked Computing Environment

Figure 18:
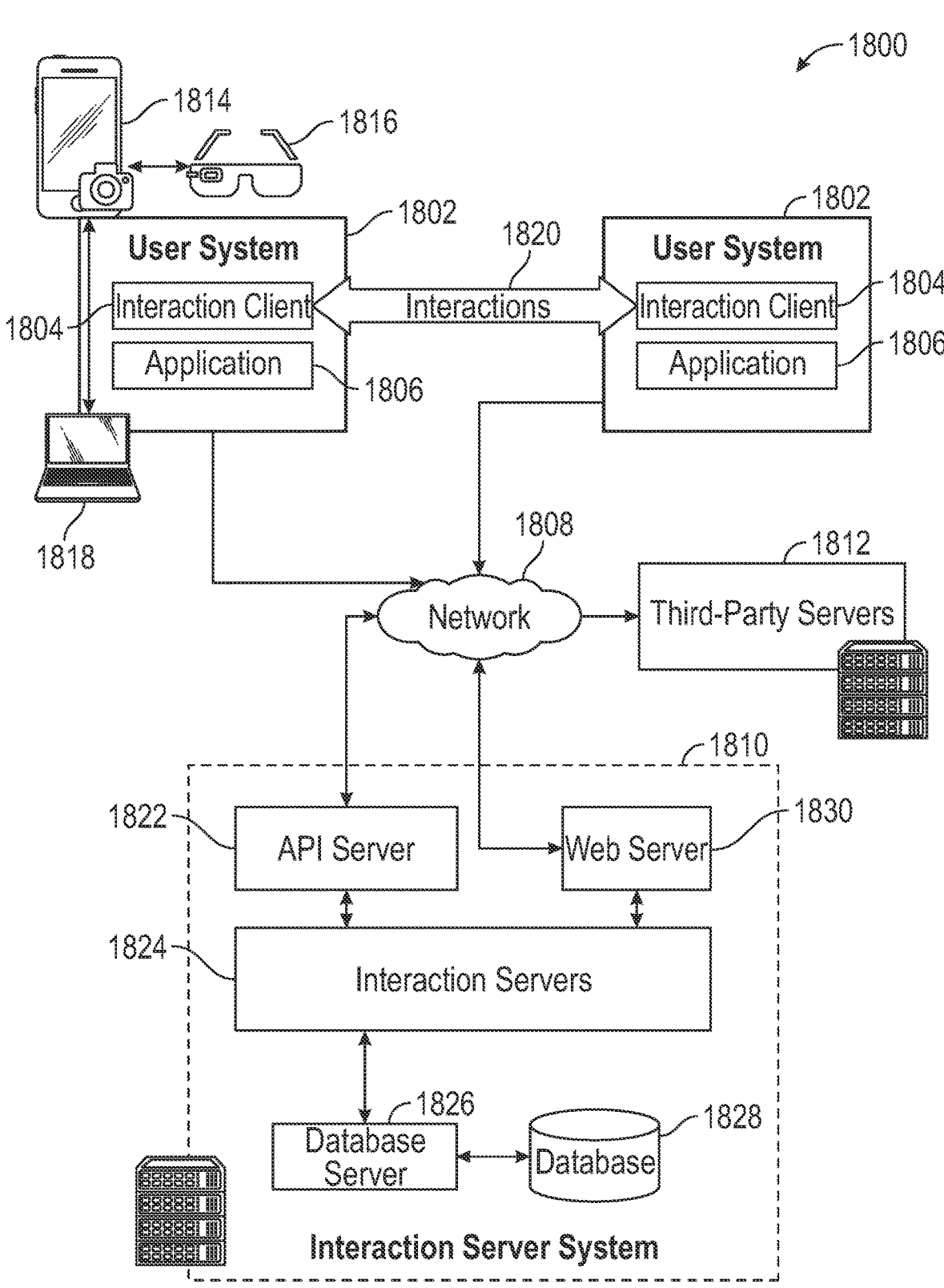
FIG. 18 is a diagrammatic representation of a networked environment in which the present disclosure may be deployed, according to some examples.

FIG. 18 is a block diagram showing an example interaction system 1800 for facilitating interactions (e.g., exchanging text messages, conducting text audio and video calls, or playing games) over a network. The interaction system 1800 includes multiple user systems 1802, each of which hosts multiple applications, including an interaction client 1804 and other applications 1806, including creation applications as described above.

Each interaction client 1804 is communicatively coupled, via one or more communication networks including a network 1808 (e.g., the Internet), to other instances of the interaction client 1804 (e.g., hosted on respective other user systems 1802), an interaction server system 1810 and third-party servers 1812). An interaction client 1804 can also communicate with locally hosted applications 1806 using Applications Program Interfaces (APIs).

The custom landmarker creation application provides an interface for users to create and update custom landmarkers. To create a new custom landmarker, the creation application presents an 'Add new landmarker' option. When selected, the creation application prompts the user to enter an ID and name for the new landmarker. The creation application determines if the ID is valid and unique. If so, the new landmarker is saved to storage and displayed in the user's list of landmarkers. The creation application then instructs the user to capture images or video of the reference scene. For each frame captured, the application detects 3D points that can be matched across frames to determine their 3D position. The creation application also determines the pose of the capture device for each frame. The 3D points and device poses are used to generate a sparse map, or localizer map, that can determine the position and orientation of a capture device with respect to the scene. A 3D model, such as a 3D mesh, is also generated based on the captured data.

The user may revisit and update the custom landmarker over time by capturing new data under different conditions. The creation application presents an 'Update landmarker' option for the selected custom landmarker. The user is prompted to capture additional images or video, and new keyframes and 3D points are added to the localizer map. The 3D model may be recreated or left unchanged.

To limit the size of the localizer map, the creation application selects keyframes for removal so the total keyframe count remains below a maximum. The selected keyframes may be random, based on timestamp, clustered, based on quality, or selected through user input. An interface is provided for the user to review and modify the keyframe selection.

The updated landmarker can then be tested to confirm it localizes correctly. If satisfied, the user can publish the update. The updated landmarker is starred for easy revisiting.

The creation application provides progress indicators while generating or updating a custom landmarker. A progress meter shows the number of keyframes, 3D points or areas captured. Interface options are provided for the user to review, test or re-capture data for any portion of the reference scene.

The custom landmarker creation application enables an efficient workflow for generating and updating custom landmarkers to provide high quality augmented reality experiences under varying conditions. The incremental update process allows landmarkers to be improved over time based on user feedback and new data.

Each user system 1802 may include multiple user devices, such as a mobile device 1814, head-wearable apparatus 1816, and a computer client device 1818 that are communicatively connected to exchange data and messages.

An interaction client 1804 interacts with other interaction clients 1804 and with the interaction server system 1810 via the network 1808. The data exchanged between the interaction clients 1804 (e.g., interactions 1820) and between the interaction clients 1804 and the interaction server system 1810 includes functions (e.g., commands to invoke functions) and payload data (e.g., text, audio, video, or other multimedia data).

The interaction server system 1810 provides server-side functionality via the network 1808 to the interaction clients 1804. While certain functions of the interaction system 1800 are described herein as being performed by either an interaction client 1804 or by the interaction server system 1810, the location of certain functionality either within the interaction client 1804 or the interaction server system 1810 may be a design choice. For example, it may be technically preferable to initially deploy particular technology and functionality within the interaction server system 1810 but to later migrate this technology and functionality to the interaction client 1804 where a user system 1802 has sufficient processing capacity.

The interaction server system 1810 supports various services and operations that are provided to the interaction clients 1804. Such operations include transmitting data to, receiving data from, and processing data generated by the interaction clients 1804. This data may include message content, client device information, geolocation information, media augmentation and overlays, message content persistence conditions, entity relationship information, and live event information. Data exchanges within the interaction system 1800 are invoked and controlled through functions available via user interfaces (UIs) of the interaction clients 1804.

Turning now specifically to the interaction server system 1810, an Application Program Interface (API) server 1822 is coupled to and provides programmatic interfaces to interaction servers 1824, making the functions of the interaction servers 1824 accessible to interaction clients 1804, other applications 1806 and third-party server 1812. The interaction servers 1824 are communicatively coupled to a database server 1826, facilitating access to a database 1828 that stores data associated with interactions processed by the interaction servers 1824. Similarly, a web server 1830 is coupled to the interaction servers 1824 and provides web-based interfaces to the interaction servers 1824. To this end, the web server 1830 processes incoming network requests over the Hypertext Transfer Protocol (HTTP) and several other related protocols.

The Application Program Interface (API) server 1822 receives and transmits interaction data (e.g., commands and message payloads) between the interaction servers 1824 and the user systems 1802 (and, for example, interaction clients 1804 and other application 1806) and the third-party server 1812. Specifically, the Application Program Interface (API) server 1822 provides a set of interfaces (e.g., routines and protocols) that can be called or queried by the interaction client 1804 and other applications 1806 to invoke functionality of the interaction servers 1824. The Application Program Interface (API) server 1822 exposes various functions supported by the interaction servers 1824, including account registration; login functionality; the sending of interaction data, via the interaction servers 1824, from a particular interaction client 1804 to another interaction client 1804; the communication of media files (e.g., images or video) from an interaction client 1804 to the interaction servers 1824; the settings of a collection of media data (e.g., a story); the retrieval of a list of friends of a user of a user system 1802; the retrieval of messages and content; the addition and deletion of entities (e.g., friends) to an entity relationship graph (e.g., the entity graph 2010); the location of friends within an entity relationship graph; and opening an application event (e.g., relating to the interaction client 1804).

The interaction servers 1824 host multiple systems and subsystems, described below with reference to FIG. 19.

System Architecture

Figure 19:
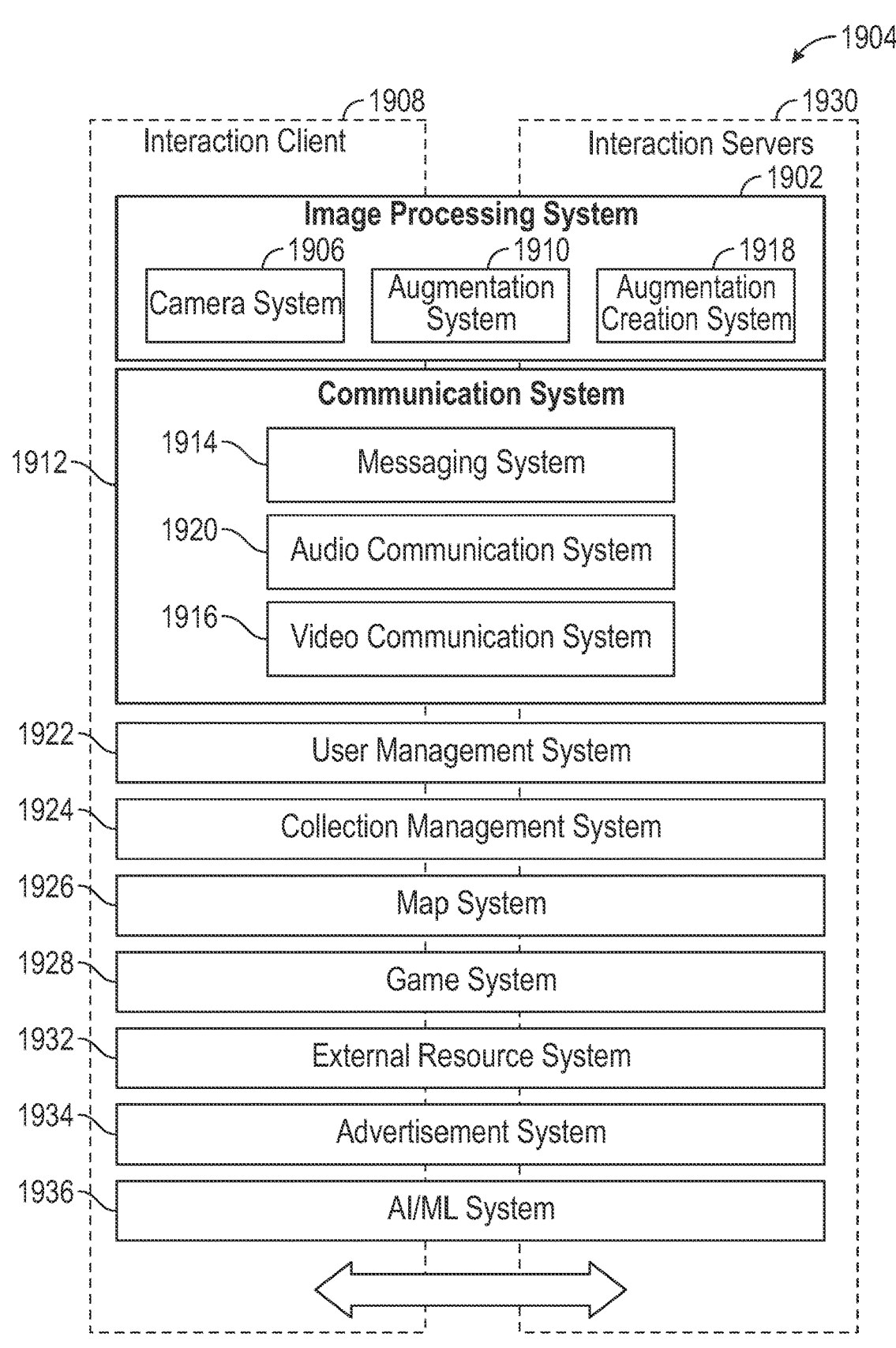
FIG. 19 is a diagrammatic representation of a messaging system that has both client-side and server-side functionality, according to some examples.

FIG. 19 is a block diagram illustrating further details regarding the interaction system 1800, according to some examples. Specifically, the interaction system 1800 is shown to comprise the interaction client 1804 and the interaction servers 1824. The interaction system 1800 embodies multiple subsystems, which are supported on the client-side by the interaction client 1804 and on the server-side by the interaction servers 1824. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 1800.

Data storage: A microservice subsystem may be responsible for its own data storage, which may be in the form of a database, cache, or other storage mechanism (e.g., using the database server 1826 and database 1828). This enables a microservice subsystem to operate independently of other microservices of the interaction system 1800.

Service discovery: Microservice subsystems may find and communicate with other microservice subsystems of the interaction system 1800. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 1800 may employ a monolithic architecture, a service-oriented architecture (SOA), a function-as-a-service (FaaS) architecture, or a modular architecture:

Example subsystems are discussed below.

An image processing system 1902 provides various functions that enable a user to capture and augment (e.g., annotate or otherwise modify or edit) media content associated with a message.

A camera system 1904 includes control software (e.g., in a camera application) that interacts with and controls hardware camera hardware (e.g., directly or via operating system controls) of the user system 1802 to modify and augment real-time images captured and displayed via the interaction client 1804.

The augmentation system 1906 provides functions related to the generation and publishing of augmentations (e.g., media overlays) for images captured in real-time by cameras of the user system 1802 or retrieved from memory of the user system 1802. For example, the augmentation system 1906 operatively selects, presents, and displays media overlays (e.g., an image filter or an image lens) to the interaction client 1804 for the augmentation of real-time images received via the camera system 1904 or stored images retrieved from memory 2202 of a user system 1802. These augmentations are selected by the augmentation system 1906 and presented to a user of an interaction client 1804, based on a number of inputs and data, such as for example:

Geolocation of the user system 1802; and

Entity relationship information of the user of the user system 1802.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 1802 for communication in a message, or applied to video content, such as a video content stream or feed transmitted from an interaction client 1804. As such, the image processing system 1902 may interact with, and support, the various subsystems of the communication system 1908, such as the messaging system 1910 and the video communication system 1912.

A media overlay may include text or image data that can be overlaid on top of a photograph taken by the user system 1802 or a video stream produced by the user system 1802. In some examples, the media overlay may be a location overlay (e.g., Venice beach), a name of a live event, or a name of a merchant overlay (e.g., Beach Coffee House). In further examples, the image processing system 1902 uses the geolocation of the user system 1802 to identify a media overlay that includes the name of a merchant at the geolocation of the user system 1802. The media overlay may include other indicia associated with the merchant. The media overlays may be stored in the databases 1828 and accessed through the database server 1826.

The image processing system 1902 provides a user-based publication platform that enables users to select a geolocation on a map and upload content associated with the selected geolocation. The user may also specify circumstances under which a particular media overlay should be offered to other users. The image processing system 1902 generates a media overlay that includes the uploaded content and associates the uploaded content with the selected geolocation.

The augmentation creation system 1914 supports augmented reality developer platforms and includes an application for content creators (e.g., artists and developers) to create and publish augmentations (e.g., augmented reality experiences) of the interaction client 1804. The augmentation creation system 1914 provides a library of built-in features and tools to content creators including, for example custom shaders, tracking technology, and templates.

In some examples, the augmentation creation system 1914 provides a merchant-based publication platform that enables merchants to select a particular augmentation associated with a geolocation via a bidding process. For example, the augmentation creation system 1914 associates a media overlay of the highest bidding merchant with a corresponding geolocation for a predefined amount of time.

A communication system 1908 is responsible for enabling and processing multiple forms of communication and interaction within the interaction system 1800 and includes a messaging system 1910, an audio communication system 1916, and a video communication system 1912. The messaging system 1910 is responsible for enforcing the temporary or time-limited access to content by the interaction clients 1804. The messaging system 1910 incorporates multiple timers (e.g., within an ephemeral timer system) that, based on duration and display parameters associated with a message or collection of messages (e.g., a story), selectively enable access (e.g., for presentation and display) to messages and associated content via the interaction client 1804. The audio communication system 1916 enables and supports audio communications (e.g., real-time audio chat) between multiple interaction clients 1804. Similarly, the video communication system 1912 enables and supports video communications (e.g., real-time video chat) between multiple interaction clients 1804.

A user management system 1918 is operationally responsible for the management of user data and profiles, and maintains entity information (e.g., stored in entity tables 2008, entity graphs 2010 and profile data 2002) regarding users and relationships between users of the interaction system 1800.

A collection management system 1920 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 1920 may also be responsible for publishing an icon that provides notification of a particular collection to the user interface of the interaction client 1804. The collection management system 1920 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 1920 employs machine vision (or image recognition technology) and content rules to curate a content collection automatically. In certain examples, compensation may be paid to a user to include user-generated content into a collection. In such cases, the collection management system 1920 operates to automatically make payments to such users to use their content.

A map system 1922 provides various geographic location (e.g., geolocation) functions and supports the presentation of map-based media content and messages by the interaction client 1804. For example, the map system 1922 enables the display of user icons or avatars (e.g., stored in profile data 2002) on a map to indicate a current or past location of "friends" of a user, as well as media content (e.g., collections of messages including photographs and videos) generated by such friends, within the context of a map. For example, a message posted by a user to the interaction system 1800 from a specific geographic location may be displayed within the context of a map at that particular location to "friends" of a specific user on a map interface of the interaction client 1804. A user can furthermore share his or her location and status information (e.g., using an appropriate status avatar) with other users of the interaction system 1800 via the interaction client 1804, with this location and status information being similarly displayed within the context of a map interface of the interaction client 1804 to selected users.

A game system 1924 provides various gaming functions within the context of the interaction client 1804. The interaction client 1804 provides a game interface providing a list of available games that can be launched by a user within the context of the interaction client 1804 and played with other users of the interaction system 1800. The interaction system 1800 further enables a particular user to invite other users to participate in the play of a specific game by issuing invitations to such other users from the interaction client 1804. The interaction client 1804 also supports audio, video, and text messaging (e.g., chats) within the context of gameplay, provides a leaderboard for the games, and also supports the provision of in-game rewards (e.g., coins and items).

An external resource system 1926 provides an interface for the interaction client 1804 to communicate with remote servers (e.g., third-party servers 1812) to launch or access external resources, i.e., applications or applets. Each third-party server 1812 hosts, for example, a markup language (e.g., HTML5) based application or a small-scale version of an application (e.g., game, utility, payment, or ride-sharing application). The interaction client 1804 may launch a web-based resource (e.g., application) by accessing the HTML5 file from the third-party servers 1812 associated with the web-based resource. Applications hosted by third-party servers 1812 are programmed in JavaScript leveraging a Software Development Kit (SDK) provided by the interaction servers 1824. The SDK includes Application Programming Interfaces (APIs) with functions that can be called or invoked by the web-based application. The interaction servers 1824 host a JavaScript library that provides a given external resource access to specific user data of the interaction client 1804. HTML5 is an example of technology for programming games, but applications and resources programmed based on other technologies can be used.

To integrate the functions of the SDK into the web-based resource, the SDK is downloaded by the third-party server 1812 from the interaction servers 1824 or is otherwise received by the third-party server 1812. Once downloaded or received, the SDK is included as part of the application code of a web-based external resource. The code of the web-based resource can then call or invoke certain functions of the SDK to integrate features of the interaction client 1804 into the web-based resource.

The SDK stored on the interaction server system 1810 effectively provides the bridge between an external resource (e.g., applications 1806 or applets) and the interaction client 1804. This gives the user a seamless experience of communicating with other users on the interaction client 1804 while also preserving the look and feel of the interaction client 1804. To bridge communications between an external resource and an interaction client 1804, the SDK facilitates communication between third-party servers 1812 and the interaction client 1804. A bridge script running on a user system 1802 establishes two one-way communication channels between an external resource and the interaction client 1804. Messages are sent between the external resource and the interaction client 1804 via these communication channels asynchronously. Each SDK function invocation is sent as a message and callback. Each SDK function is implemented by constructing a unique callback identifier and sending a message with that callback identifier.

By using the SDK, not all information from the interaction client 1804 is shared with third-party servers 1812. The SDK limits which information is shared based on the needs of the external resource. Each third-party server 1812 provides an HTML5 file corresponding to the web-based external resource to interaction servers 1824. The interaction servers 1824 can add a visual representation (such as a box art or other graphic) of the web-based external resource in the interaction client 1804. Once the user selects the visual representation or instructs the interaction client 1804 through a GUI of the interaction client 1804 to access features of the web-based external resource, the interaction client 1804 obtains the HTML5 file and instantiates the resources to access the features of the web-based external resource.

The interaction client 1804 presents a graphical user interface (e.g., a landing page or title screen) for an external resource. During, before, or after presenting the landing page or title screen, the interaction client 1804 determines whether the launched external resource has been previously authorized to access user data of the interaction client 1804. In response to determining that the launched external resource has been previously authorized to access user data of the interaction client 1804, the interaction client 1804 presents another graphical user interface of the external resource that includes functions and features of the external resource. In response to determining that the launched external resource has not been previously authorized to access user data of the interaction client 1804, after a threshold period of time (e.g., 3 seconds) of displaying the landing page or title screen of the external resource, the interaction client 1804 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 1804 adds the external resource to a list of authorized external resources and allows the external resource to access user data from the interaction client 1804. The external resource is authorized by the interaction client 1804 to access the user data under an OAuth 2 framework.

The interaction client 1804 controls the type of user data that is shared with external resources based on the type of external resource being authorized. For example, external resources that include full-scale applications (e.g., an application 1806) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 1928 operationally enables the purchasing of advertisements by third parties for presentation to end-users via the interaction clients 1804 and also handles the delivery and presentation of these advertisements.

An artificial intelligence and machine learning system 1930 provides a variety of services to different subsystems within the interaction system 1800. For example, the artificial intelligence and machine learning system 1930 operates with the image processing system 1902 and the camera system 1904 to analyze images and extract information such as objects, text, or faces. This information can then be used by the image processing system 1902 to enhance, filter, or manipulate images. The artificial intelligence and machine learning system 1930 may be used by the augmentation system 1906 to generate augmented content and augmented reality experiences, such as adding virtual objects or animations to real-world images. The communication system 1908 and messaging system 1910 may use the artificial intelligence and machine learning system 1930 to analyze communication patterns and provide insights into how users interact with each other and provide intelligent message classification and tagging, such as categorizing messages based on sentiment or topic. The artificial intelligence and machine learning system 1930 may also provide chatbot functionality to message interactions 1820 between user systems 1802 and between a user system 1802 and the interaction server system 1810. The artificial intelligence and machine learning system 1930 may also work with the audio communication system 1916 to provide speech recognition and natural language processing capabilities, allowing users to interact with the interaction system 1800 using voice commands.

Data Architecture

Figure 20:
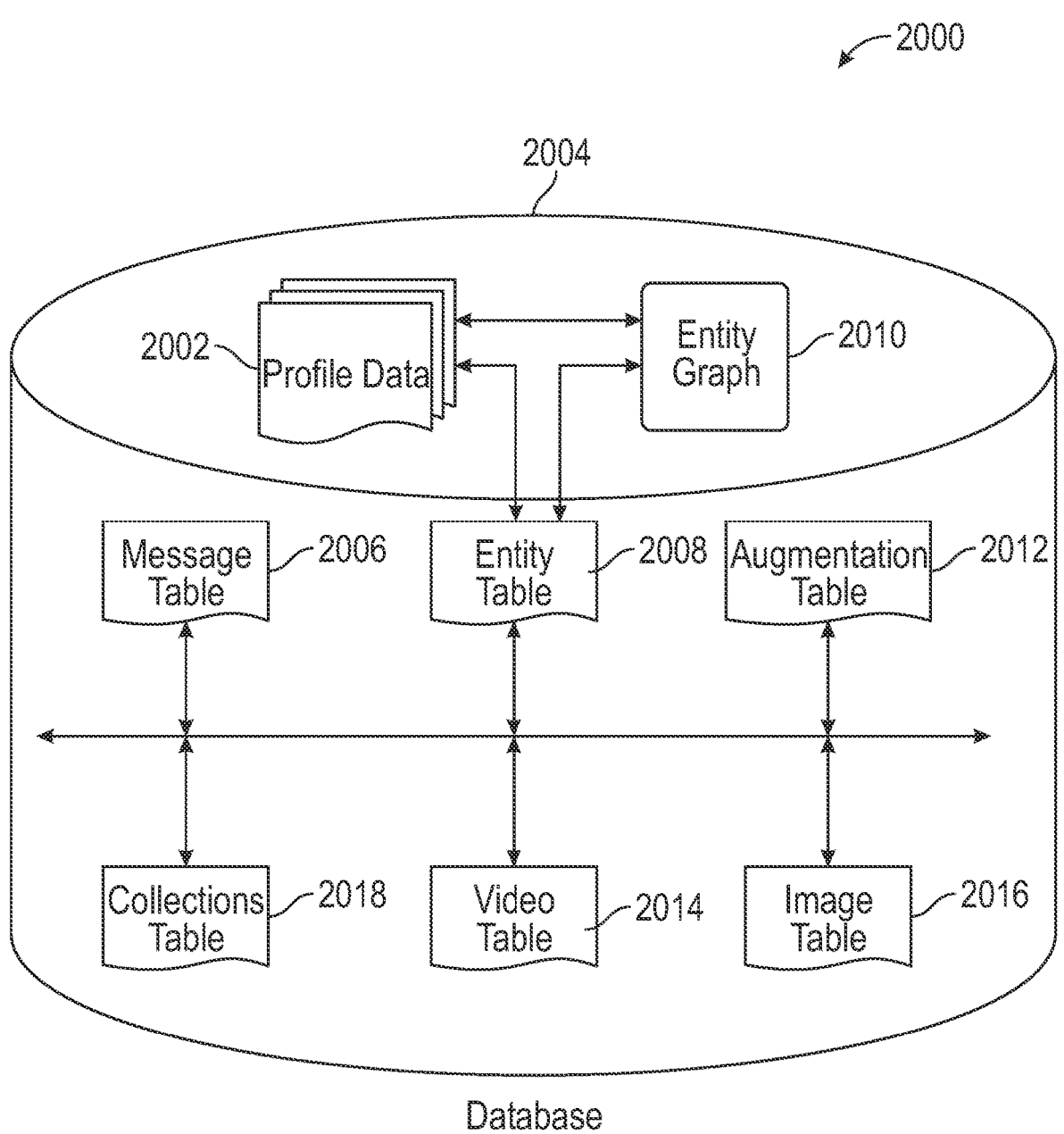
FIG. 20 is a diagrammatic representation of a data structure as maintained in a database, according to some examples.

FIG. 20 is a schematic diagram illustrating data structures 2000, which may be stored in the database 2004 of the interaction server system 1810, according to certain examples. While the content of the database 2004 is shown to comprise multiple tables, it will be appreciated that the data could be stored in other types of data structures (e.g., as an object-oriented database).

The database 2004 includes message data stored within a message table 2006. This message data includes, for any particular message, at least message sender data, message recipient (or receiver) data, and a payload. Further details regarding information that may be included in a message, and included within the message data stored in the message table 2006, are described below with reference to FIG. 20.

An entity table 2008 stores entity data, and is linked (e.g., referentially) to an entity graph 2010 and profile data 2002. Entities for which records are maintained within the entity table 2008 may include individuals, corporate entities, organizations, objects, places, events, and so forth. Regardless of entity type, any entity regarding which the interaction server system 1810 stores data may be a recognized entity. Each entity is provided with a unique identifier, as well as an entity type identifier (not shown).

The entity graph 2010 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 1800.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 2008. Such privacy settings may be applied to all types of relationships within the context of the interaction system 1800, or may selectively be applied to certain types of relationships.

The profile data 2002 stores multiple types of profile data about a particular entity. The profile data 2002 may be selectively used and presented to other users of the interaction system 1800 based on privacy settings specified by a particular entity. Where the entity is an individual, the profile data 2002 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 1800, and on map interfaces displayed by interaction clients 1804 to other users. The collection of avatar representations may include "status avatars," which present a graphical representation of a status or activity that the user may select to communicate at a particular time.

Where the entity is a group, the profile data 2002 for the group may similarly include one or more avatar representations associated with the group, in addition to the group name, members, and various settings (e.g., notifications) for the relevant group.

The database 2004 also stores augmentation data, such as overlays or filters, in an augmentation table 2012. The augmentation data is associated with and applied to videos (for which data is stored in a video table 2014) and images (for which data is stored in an image table 2016).

Filters, in some examples, are overlays that are displayed as overlaid on an image or video during presentation to a recipient user. Filters may be of various types, including user-selected filters from a set of filters presented to a sending user by the interaction client 1804 when the sending user is composing a message. Other types of filters include geolocation filters (also known as geo-filters), which may be presented to a sending user based on geographic location. For example, geolocation filters specific to a neighborhood or special location may be presented within a user interface by the interaction client 1804, based on geolocation information determined by a Global Positioning System (GPS) unit of the user system 1802.

Another type of filter is a data filter, which may be selectively presented to a sending user by the interaction client 1804 based on other inputs or information gathered by the user system 1802 during the message creation process. Examples of data filters include current temperature at a specific location, a current speed at which a sending user is traveling, battery life for a user system 1802, or the current time.

Other augmentation data that may be stored within the image table 2016 includes augmented reality content items (e.g., corresponding to applying "lenses" or augmented reality experiences). An augmented reality content item may be a real-time special effect and sound that may be added to an image or a video.

A collections table 2018 stores data regarding collections of messages and associated image, video, or audio data, which are compiled into a collection (e.g., a story or a gallery). The creation of a particular collection may be initiated by a particular user (e.g., each user for which a record is maintained in the entity table 2008). A user may create a "personal story" in the form of a collection of content that has been created and sent/broadcast by that user. To this end, the user interface of the interaction client 1804 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 1804, to contribute content to a particular live story. The live story may be identified to the user by the interaction client 1804, based on his or her location. The end result is a "live story" told from a community perspective.

A further type of content collection is known as a "location story," which enables a user whose user system 1802 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 2014 stores video data that, in some examples, is associated with messages for which records are maintained within the message table 2006. Similarly, the image table 2016 stores image data associated with messages for which message data is stored in the entity table 2008. The entity table 2008 may associate various augmentations from the augmentation table 2012 with various images and videos stored in the image table 2016 and the video table 2014.

Data Communications Architecture

Figure 21:
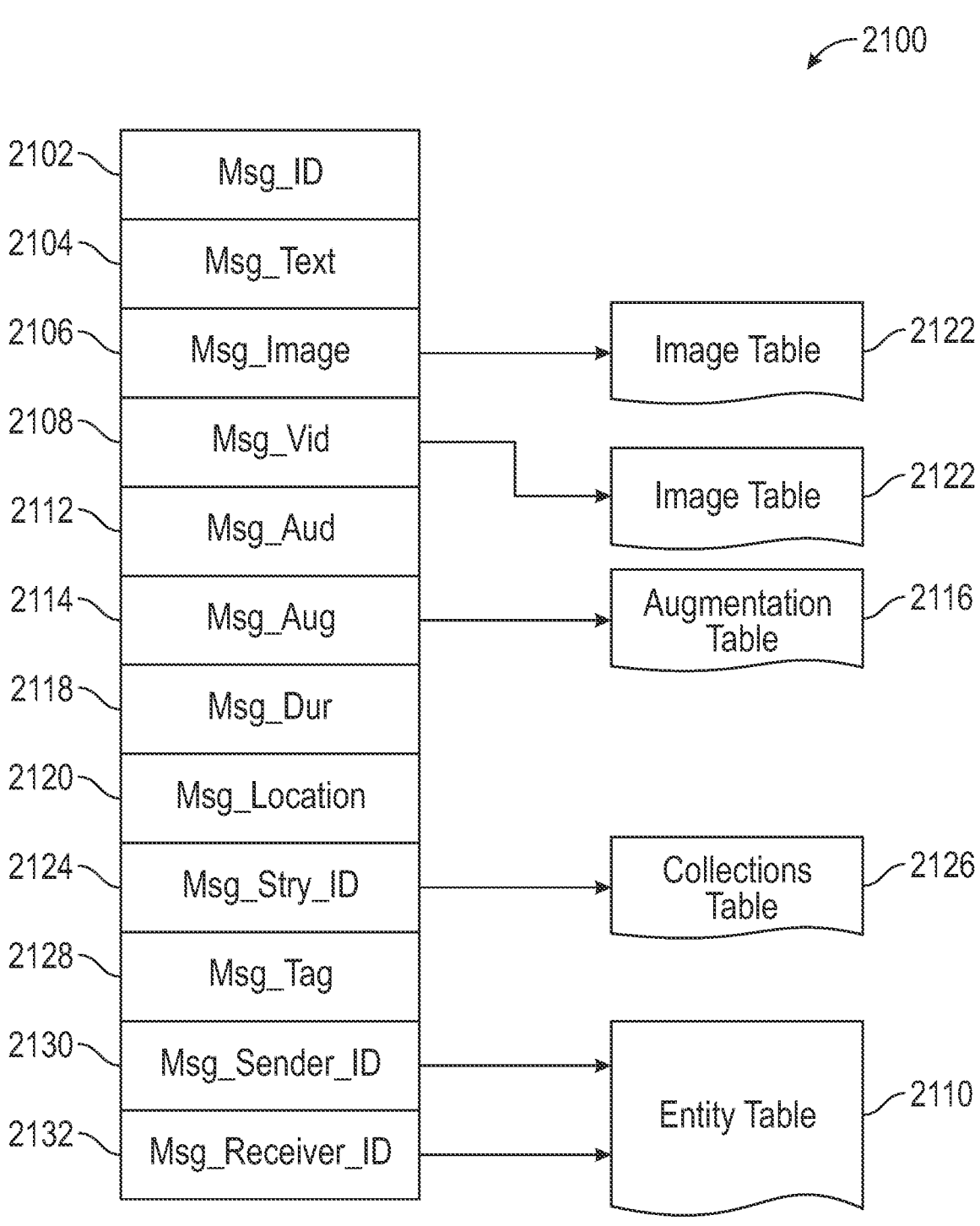
FIG. 21 is a diagrammatic representation of a message, according to some examples.

FIG. 21 is a schematic diagram illustrating a structure of a message 2100, according to some examples, generated by an interaction client 1804 for communication to a further interaction client 1804 via the interaction servers 1824. The content of a particular message 2100 is used to populate the message table 2006 stored within the database 2004, accessible by the interaction servers 1824. Similarly, the content of a message 2100 is stored in memory as "in-transit" or "in-flight" data of the user system 1802 or the interaction servers 1824. A message 2100 is shown to include the following example components:

Message identifier 2102: a unique identifier that identifies the message 2100.

Message text payload 2104: text, to be generated by a user via a user interface of the user system 1802, and that is included in the message 2100.

Message image payload 2106: image data, captured by a camera component of a user system 1802 or retrieved from a memory component of a user system 1802, and that is included in the message 2100. Image data for a sent or received message 2100 may be stored in the image table 2016.

Message video payload 2108: video data, captured by a camera component or retrieved from a memory component of the user system 1802, and that is included in the message 2100. Video data for a sent or received message 2100 may be stored in the image table 2016.

Message audio payload 2110: audio data, captured by a microphone or retrieved from a memory component of the user system 1802, and that is included in the message 2100.

Message augmentation data 2112: augmentation data (e.g., filters, stickers, or other annotations or enhancements) that represents augmentations to be applied to message image payload 2106, message video payload 2108, or message audio payload 2110 of the message 2100. Augmentation data for a sent or received message 2100 may be stored in the augmentation table 2012.

Message duration parameter 2114: parameter value indicating, in seconds, the amount of time for which content of the message (e.g., the message image payload 2106, message video payload 2108, message audio payload 2110) is to be presented or made accessible to a user via the interaction client 1804.

Message geolocation parameter 2116: geolocation data (e.g., latitudinal and longitudinal coordinates) associated with the content payload of the message. Multiple message geolocation parameter 2116 values may be included in the payload, each of these parameter values being associated with respect to content items included in the content (e.g., a specific image within the message image payload 2106, or a specific video in the message video payload 2108).

Message story identifier 2118: identifier values identifying one or more content collections (e.g., "stories" identified in the collections table 2018) with which a particular content item in the message image payload 2106 of the message 2100 is associated. For example, multiple images within the message image payload 2106 may each be associated with multiple content collections using identifier values.

Message tag 2120: each message 2100 may be tagged with multiple tags, each of which is indicative of the subject matter of content included in the message payload. For example, where a particular image included in the message image payload 2106 depicts an animal (e.g., a lion), a tag value may be included within the message tag 2120 that is indicative of the relevant animal. Tag values may be generated manually, based on user input, or may be automatically generated using, for example, image recognition.

Message sender identifier 2122: an identifier (e.g., a messaging system identifier, email address, or device identifier) indicative of a user of the user system 1802 on which the message 2100 was generated and from which the message 2100 was sent.

Message receiver identifier 2124: an identifier (e.g., a messaging system identifier, email address, or device identifier) indicative of a user of the user system 1802 to which the message 2100 is addressed.

The contents (e.g., values) of the various components of message 2100 may be pointers to locations in tables within which content data values are stored. For example, an image value in the message image payload 2106 may be a pointer to (or address of) a location within an image table 2016. Similarly, values within the message video payload 2108 may point to data stored within an image table 2016, values stored within the message augmentation data 2112 may point to data stored in an augmentation table 2012, values stored within the message story identifier 2118 may point to data stored in a collections table 2018, and values stored within the message sender identifier 2122 and the message receiver identifier 2124 may point to user records stored within an entity table 2008.

System with Head-Wearable Apparatus

Figure 22:
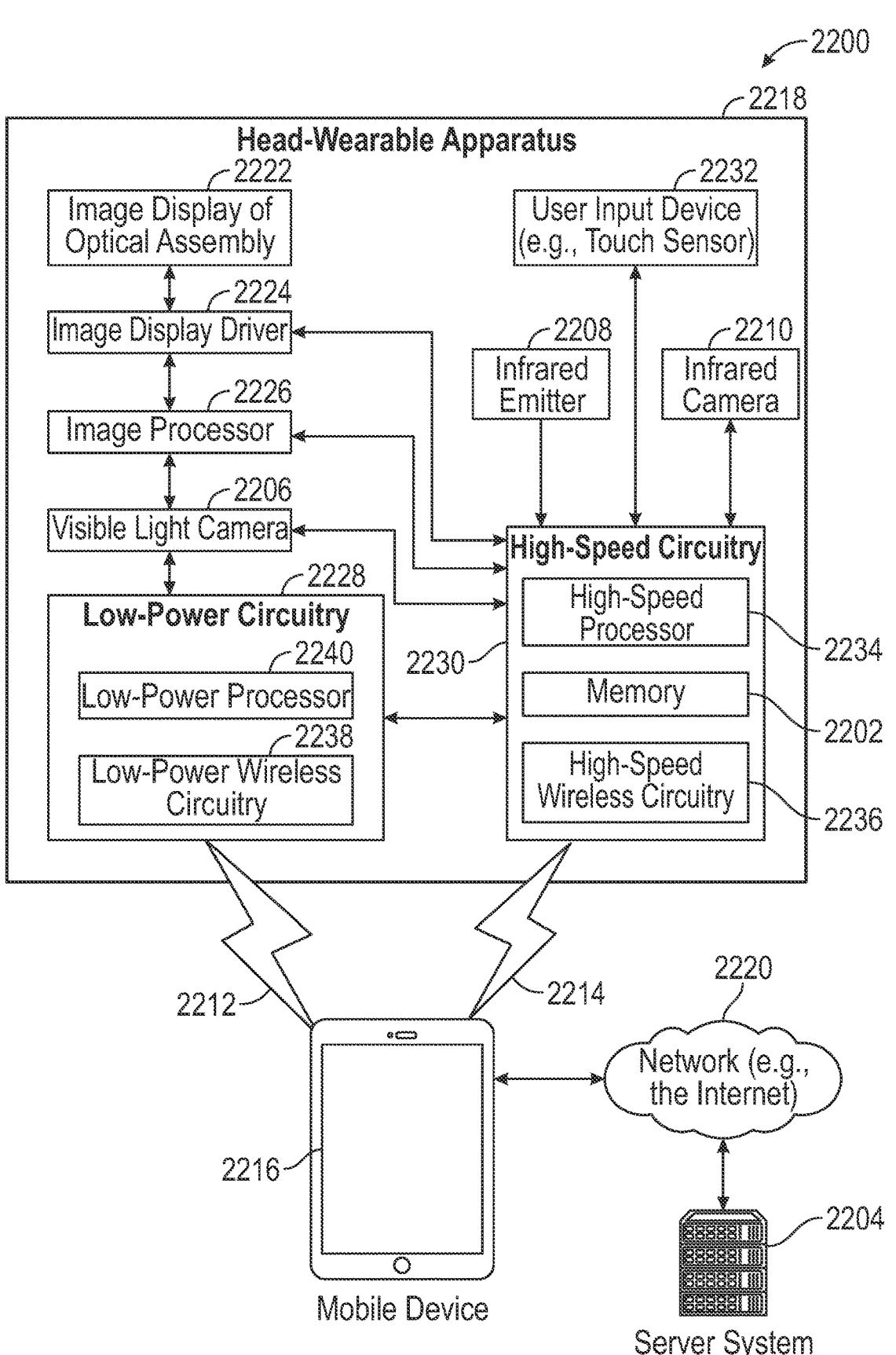
FIG. 22 illustrates a system in which the head-wearable apparatus, according to some examples.

FIG. 22 illustrates a system 2200 including a head-wearable apparatus 1816 with a selector input device, according to some examples. FIG. 22 is a high-level functional block diagram of an example head-wearable apparatus 1816 communicatively coupled to a mobile device 1814 and various server systems 2204 (e.g., the interaction server system 1810) via various networks 1808.

The head-wearable apparatus 1816 includes one or more cameras, each of which may be, for example, a visible light camera 2206, an infrared emitter 2208, and an infrared camera 2210.

The mobile device 1814 connects with head-wearable apparatus 1816 using both a low-power wireless connection 2212 and a high-speed wireless connection 2214. The mobile device 1814 is also connected to the server system 2204 and the network 2216.

The head-wearable apparatus 1816 further includes two image displays of the image display of optical assembly 2218. The two image displays of optical assembly 2218 include one associated with the left lateral side and one associated with the right lateral side of the head-wearable apparatus 1816. The head-wearable apparatus 1816 also includes an image display driver 2220, an image processor 2222, low-power circuitry 2224, and high-speed circuitry 2226. The image display of optical assembly 2218 is for presenting images and videos, including an image that can include a graphical user interface to a user of the head-wearable apparatus 1816.

The image display driver 2220 commands and controls the image display of optical assembly 2218. The image display driver 2220 may deliver image data directly to the image display of optical assembly 2218 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 1816 includes a frame and stems (or temples) extending from a lateral side of the frame. The head-wearable apparatus 1816 further includes a user input device 2228 (e.g., touch sensor or push button), including an input surface on the head-wearable apparatus 1816. The user input device 2228 (e.g., touch sensor or push button) is to receive from the user an input selection to manipulate the graphical user interface of the presented image.

The components shown in FIG. 22 for the head-wearable apparatus 1816 are located on one or more circuit boards, for example a PCB or flexible PCB, in the rims or temples. Alternatively, or additionally, the depicted components can be located in the chunks, frames, hinges, or bridge of the head-wearable apparatus 1816. Left and right visible light cameras 2206 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 1816 includes a memory 2202, which stores instructions to perform a subset or all of the functions described herein. The memory 2202 can also include storage device.

As shown in FIG. 22, the high-speed circuitry 2226 includes a high-speed processor 2230, a memory 2202, and high-speed wireless circuitry 2232. In some examples, the image display driver 2220 is coupled to the high-speed circuitry 2226 and operated by the high-speed processor 2230 in order to drive the left and right image displays of the image display of optical assembly 2218. The high-speed processor 2230 may be any processor capable of managing high-speed communications and operation of any general computing system needed for the head-wearable apparatus 1816. The high-speed processor 2230 includes processing resources needed for managing high-speed data transfers on a high-speed wireless connection 2214 to a wireless local area network (WLAN) using the high-speed wireless circuitry 2232. In certain examples, the high-speed processor 2230 executes an operating system such as a LINUX operating system or other such operating system of the head-wearable apparatus 1816, and the operating system is stored in the memory 2202 for execution. In addition to any other responsibilities, the high-speed processor 2230 executing a software architecture for the head-wearable apparatus 1816 is used to manage data transfers with high-speed wireless circuitry 2232. In certain examples, the high-speed wireless circuitry 2232 is configured to implement Institute of Electrical and Electronic Engineers (IEEE) 802.11 communication standards, also referred to herein as WI-FI®. In some examples, other high-speed communications standards may be implemented by the high-speed wireless circuitry 2232.

The low-power wireless circuitry 2234 and the high-speed wireless circuitry 2232 of the head-wearable apparatus 1816 can include short-range transceivers (Bluetooth™) and wireless wide, local, or wide area network transceivers (e.g., cellular or WI-FI®). Mobile device 1814, including the transceivers communicating via the low-power wireless connection 2212 and the high-speed wireless connection 2214, may be implemented using details of the architecture of the head-wearable apparatus 1816, as can other elements of the network 2216.

The memory 2202 includes any storage device capable of storing various data and applications, including, among other things, camera data generated by the left and right visible light cameras 2206, the infrared camera 2210, and the image processor 2222, as well as images generated for display by the image display driver 2220 on the image displays of the image display of optical assembly 2218. While the memory 2202 is shown as integrated with high-speed circuitry 2226, in some examples, the memory 2202 may be an independent standalone element of the head-wearable apparatus 1816. In certain such examples, electrical routing lines may provide a connection through a chip that includes the high-speed processor 2230 from the image processor 2222 or the low-power processor 2236 to the memory 2202. In some examples, the high-speed processor 2230 may manage addressing of the memory 2202 such that the low-power processor 2236 will boot the high-speed processor 2230 any time that a read or write operation involving memory 2202 is needed.

As shown in FIG. 22, the low-power processor 2236 or high-speed processor 2230 of the head-wearable apparatus 1816 can be coupled to the camera (visible light camera 2206, infrared emitter 2208, or infrared camera 2210), the image display driver 2220, the user input device 2228 (e.g., touch sensor or push button), and the memory 2202.

The head-wearable apparatus 1816 is connected to a host computer. For example, the head-wearable apparatus 1816 is paired with the mobile device 1814 via the high-speed wireless connection 2214 or connected to the server system 2204 via the network 2216. The server system 2204 may be one or more computing devices as part of a service or network computing system, for example, which includes a processor, a memory, and network communication interface to communicate over the network 2216 with the mobile device 1814 and the head-wearable apparatus 1816.

The mobile device 1814 includes a processor and a network communication interface coupled to the processor. The network communication interface allows for communication over the network 2216, low-power wireless connection 2212, or high-speed wireless connection 2214. Mobile device 1814 can further store at least portions of the instructions in the memory of the mobile device 1814 memory to implement the functionality described herein.

Output components of the head-wearable apparatus 1816 include visual components, such as a display such as a liquid crystal display (LCD), a plasma display panel (PDP), a light-emitting diode (LED) display, a projector, or a waveguide. The image displays of the optical assembly are driven by the image display driver 2220. The output components of the head-wearable apparatus 1816 further include acoustic components (e.g., speakers), haptic components (e.g., a vibratory motor), other signal generators, and so forth. The input components of the head-wearable apparatus 1816, the mobile device 1814, and server system 2204, such as the user input device 2228, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 1816 may also include additional peripheral device elements. Such peripheral device elements may include biometric sensors, additional sensors, or display elements integrated with the head-wearable apparatus 1816. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:

Electroencephalography (EEG) based BMIs, which record electrical activity in the brain using electrodes placed on the scalp.

Invasive BMIs, which used electrodes that are surgically implanted into the brain.

Optogenetics BMIs, which use light to control the activity of specific nerve cells in the brain.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 2212 and high-speed wireless connection 2214 from the mobile device 1814 via the low-power wireless circuitry 2234 or high-speed wireless circuitry 2232.

Machine Architecture

Figure 23:
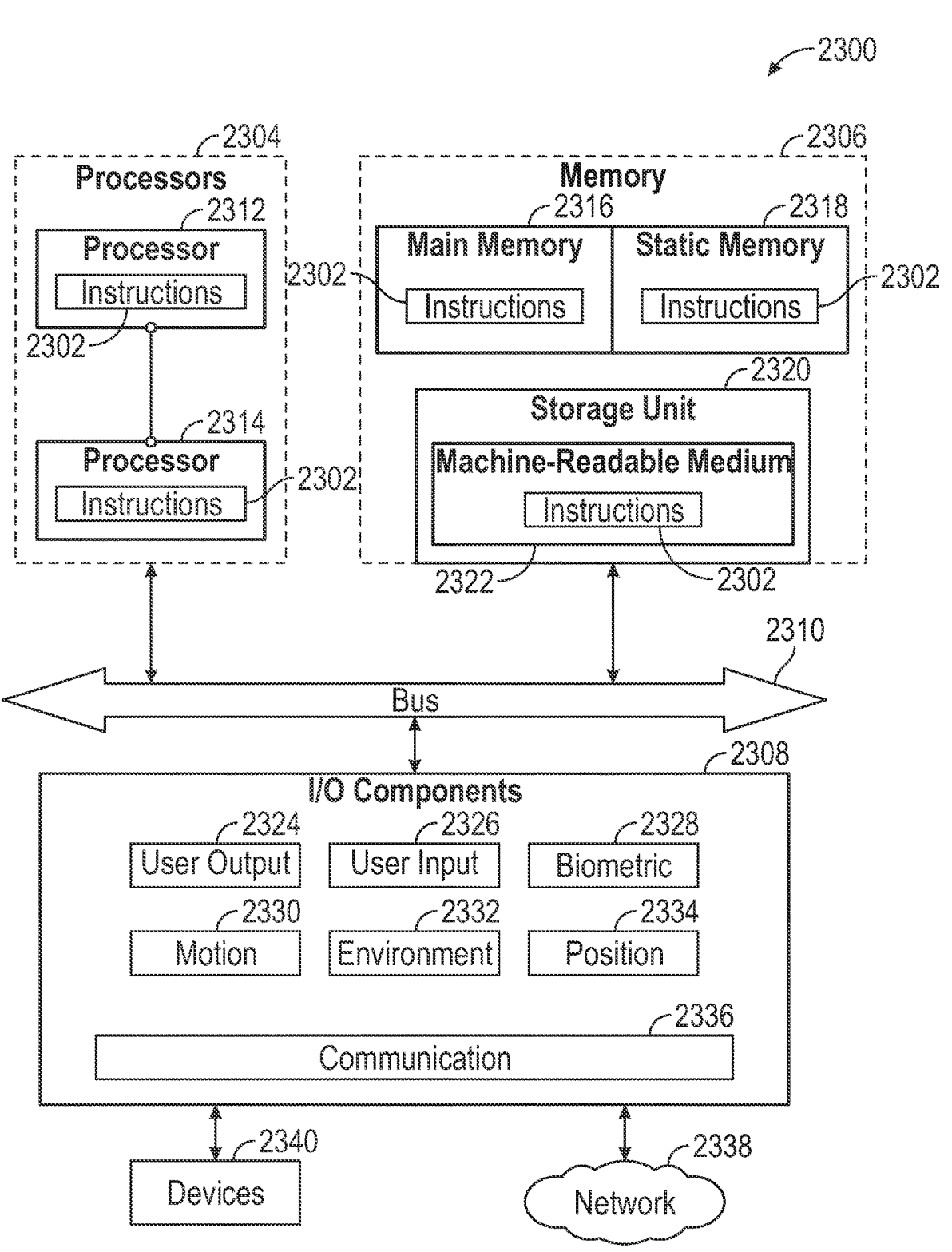
FIG. 23 is a diagrammatic representation of a machine in the form of a computer system within which a set of instructions may be executed to cause the machine to perform any one or more of the methodologies discussed herein, according to some examples.

FIG. 23 is a diagrammatic representation of the machine 2300 within which instructions 2302 (e.g., software, a program, an application, an applet, an app, or other executable code) for causing the machine 2300 to perform any one or more of the methodologies discussed herein may be executed. For example, the instructions 2302 may cause the machine 2300 to execute any one or more of the methods described herein. The instructions 2302 transform the general, non-programmed machine 2300 into a particular machine 2300 programmed to carry out the described and illustrated functions in the manner described. The machine 2300 may operate as a standalone device or may be coupled (e.g., networked) to other machines. In a networked deployment, the machine 2300 may operate in the capacity of a server machine or a client machine in a server-client network environment, or as a peer machine in a peer-to-peer (or distributed) network environment. The machine 2300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 2302, sequentially or otherwise, that specify actions to be taken by the machine 2300. Further, while a single machine 2300 is illustrated, the term "machine" shall also be taken to include a collection of machines that individually or jointly execute the instructions 2302 to perform any one or more of the methodologies discussed herein. The machine 2300, for example, may comprise the user system 1802 or any one of multiple server devices forming part of the interaction server system 1810. In some examples, the machine 2300 may also comprise both client and server systems, with certain operations of a particular method or algorithm being performed on the server-side and with certain operations of the particular method or algorithm being performed on the client-side.

The machine 2300 may include processors 2304, memory 2306, and input/output I/O components 2308, which may be configured to communicate with each other via a bus 2310. In an example, the processors 2304 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 2312 and a processor 2314 that execute the instructions 2302. The term "processor" is intended to include multi-core processors that may comprise two or more independent processors (sometimes referred to as "cores") that may execute instructions contemporaneously. Although FIG. 23 shows multiple processors 2304, the machine 2300 may include a single processor with a single-core, a single processor with multiple cores (e.g., a multi-core processor), multiple processors with a single core, multiple processors with multiples cores, or any combination thereof.

The memory 2306 includes a main memory 2316, a static memory 2318, and a storage unit 2320, both accessible to the processors 2304 via the bus 2310. The main memory 2306, the static memory 2318, and storage unit 2320 store the instructions 2302 embodying any one or more of the methodologies or functions described herein. The instructions 2302 may also reside, completely or partially, within the main memory 2316, within the static memory 2318, within machine-readable medium 2322 within the storage unit 2320, within at least one of the processors 2304 (e.g., within the processor's cache memory), or any suitable combination thereof, during execution thereof by the machine 2300.

The I/O components 2308 may include a wide variety of components to receive input, provide output, produce output, transmit information, exchange information, capture measurements, and so on. The specific I/O components 2308 that are included in a particular machine will depend on the type of machine. For example, portable machines such as mobile phones may include a touch input device or other such input mechanisms, while a headless server machine will likely not include such a touch input device. It will be appreciated that the I/O components 2308 may include many other components that are not shown in FIG. 23. In various examples, the I/O components 2308 may include user output components 2324 and user input components 2326. The user output components 2324 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 2326 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 2308 may include biometric components 2328, motion components 2330, environmental components 2332, or position components 2334, among a wide array of other components. For example, the biometric components 2328 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:

Electroencephalography (EEG) based BMIs, which record electrical activity in the brain using electrodes placed on the scalp.

Invasive BMIs, which used electrodes that are surgically implanted into the brain.

Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 2330 include acceleration sensor components (e.g., accelerometer), gravitation sensor components, rotation sensor components (e.g., gyroscope).

The environmental components 2332 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 1802 may have a camera system comprising, for example, front cameras on a front surface of the user system 1802 and rear cameras on a rear surface of the user system 1802. The front cameras may, for example, be used to capture still images and video of a user of the user system 1802 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 1802 may also include a 360° camera for capturing 360° photographs and videos.

Further, the camera system of the user system 1802 may include dual rear cameras (e.g., a primary camera as well as a depth-sensing camera), or even triple, quad or penta rear camera configurations on the front and rear sides of the user system 1802. These multiple cameras systems may include a wide camera, an ultra-wide camera, a telephoto camera, a macro camera, and a depth sensor, for example.

The position components 2334 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2308 further include communication components 2336 operable to couple the machine 2300 to a network 2338 or devices 2340 via respective coupling or connections. For example, the communication components 2336 may include a network interface component or another suitable device to interface with the network 2338. In further examples, the communication components 2336 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2340 may be another machine or any of a wide variety of peripheral devices (e.g., a peripheral device coupled via a USB).

Moreover, the communication components 2336 may detect identifiers or include components operable to detect identifiers. For example, the communication components 2336 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 2336, such as location via Internet Protocol (IP) geolocation, location via Wi-Fi® signal triangulation, location via detecting an NFC beacon signal that may indicate a particular location, and so forth.

The various memories (e.g., main memory 2316, static memory 2318, and memory of the processors 2304) and storage unit 2320 may store one or more sets of instructions and data structures (e.g., software) embodying or used by any one or more of the methodologies or functions described herein. These instructions (e.g., the instructions 2302), when executed by processors 2304, cause various operations to implement the disclosed examples.

The instructions 2302 may be transmitted or received over the network 2338, using a transmission medium, via a network interface device (e.g., a network interface component included in the communication components 2336) and using any one of several well-known transfer protocols (e.g., hypertext transfer protocol (HTTP)). Similarly, the instructions 2302 may be transmitted or received using a transmission medium via a coupling (e.g., a peer-to-peer coupling) to the devices 2340.

Software Architecture

Figure 24:
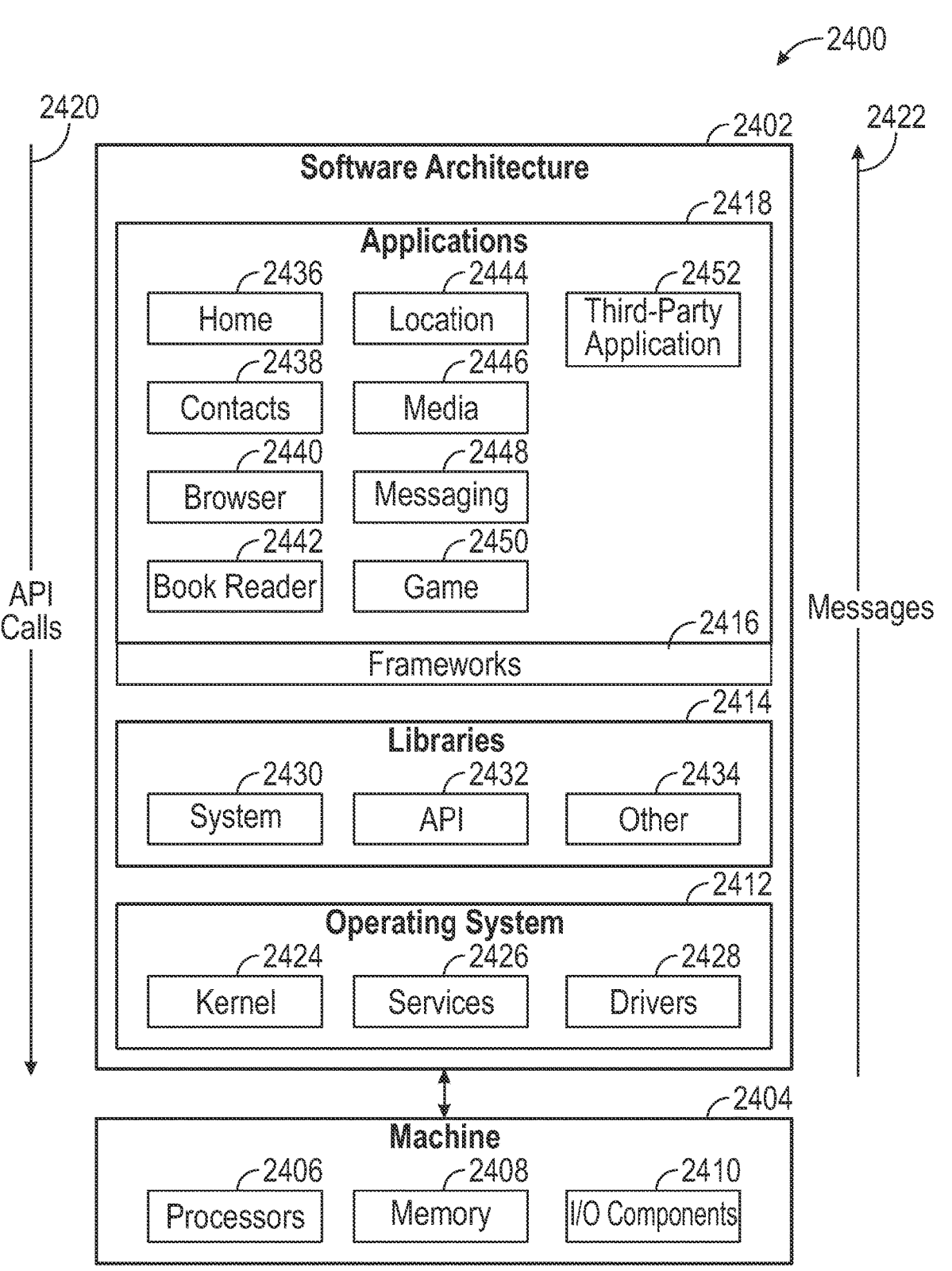
FIG. 24 is a block diagram showing a software architecture within which examples may be implemented.

FIG. 24 is a block diagram 2400 illustrating a software architecture 2402, which can be installed on any one or more of the devices described herein. The software architecture 2402 is supported by hardware such as a machine 2404 that includes processors 2406, memory 2408, and I/O components 2410. In this example, the software architecture 2402 can be conceptualized as a stack of layers, where each layer provides a particular functionality. The software architecture 2402 includes layers such as an operating system 2412, libraries 2414, frameworks 2416, and applications 2418. Operationally, the applications 2418 invoke API calls 2420 through the software stack and receive messages 2422 in response to the API calls 2420.

The operating system 2412 manages hardware resources and provides common services. The operating system 2412 includes, for example, a kernel 2424, services 2426, and drivers 2428. The kernel 2424 acts as an abstraction layer between the hardware and the other software layers. For example, the kernel 2424 provides memory management, processor management (e.g., scheduling), component management, networking, and security settings, among other functionalities. The services 2426 can provide other common services for the other software layers. The drivers 2428 are responsible for controlling or interfacing with the underlying hardware. For instance, the drivers 2428 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 2414 provide a common low-level infrastructure used by the applications 2418. The libraries 2414 can include system libraries 2430 (e.g., C standard library) that provide functions such as memory allocation functions, string manipulation functions, mathematic functions, and the like. In addition, the libraries 2414 can include API libraries 2432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2414 can also include a wide variety of other libraries 2434 to provide many other APIs to the applications 2418.

The frameworks 2416 provide a common high-level infrastructure that is used by the applications 2418. For example, the frameworks 2416 provide various graphical user interface (GUI) functions, high-level resource management, and high-level location services. The frameworks 2416 can provide a broad spectrum of other APIs that can be used by the applications 2418, some of which may be specific to a particular operating system or platform.

In an example, the applications 2418 may include a home application 2436, a contacts application 2438, a browser application 2440, a book reader application 2442, a location application 2444, a media application 2446, a messaging application 2448, a game application 2450, and a broad assortment of other applications such as a third-party application 2452. The applications 2418 are programs that execute functions defined in the programs. Various programming languages can be employed to create one or more of the applications 2418, structured in a variety of manners, such as object-oriented programming languages (e.g., Objective-C, Java, or C++) or procedural programming languages (e.g., C or assembly language). In a specific example, the third-party application 2452 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2452 can invoke the API calls 2420 provided by the operating system 2412 to facilitate functionalities described herein.

CONCLUSION

The examples provided in this disclosure related to methods and systems for incrementally updating a custom landmarker to improve localization and tracking performance. A custom landmarker may refers to a 3D model and localizer map built for a real-world reference scene, such as a room, building, or object. The custom landmarker can be used to determine the position and orientation of a capture device, such as a camera, with respect to the reference scene.

The methods and systems described allow a custom landmarker to be updated incrementally when the reference scene is revisited. This may be useful when the reference scene is viewed under different conditions, such as different lighting, from a wider range of positions, or if the surrounding environment has changed. Updating the custom landmarker incrementally adds new keyframes and 3D points to the existing localizer map to expand its coverage and improve localization across various conditions.

To generate an updated localizer map, new keyframes and 3D points are captured from the reference scene. The pose of the capture device for each new keyframe is determined. One or more target keyframes are then selected from the new keyframes and the existing keyframes in the preliminary localizer map. The selected target keyframes, along with their associated 3D points, are used to generate the updated localizer map. The updated localizer map may then be aligned with an existing 3D model of the reference scene.

The example methods also describe controlling the size of the updated localizer map by purging keyframes from the preliminary localizer map and/or new keyframes to keep the total keyframe count below a maximum number. Keyframes may be selected for purging randomly, based on timestamp, by clustering keyframes, based on quality, or through user input.

An updated 3D model of the reference scene may be generated based on the aligned updated localizer map and the existing 3D model. The updated 3D model and localizer map can then be used to provide improved localization and tracking of the capture device with respect to the reference scene.

EXAMPLES

Example 1 is a method to generate an updated localizer map of a reference scene, the method comprising: acquiring a preliminary localizer map of the reference scene, the preliminary localizer map including a preliminary frame that each is associated with a set of preliminary data points; capturing, using a capture device, a plurality of new data points on the reference scene; determining a pose of the capture device related to the capture of the plurality of new data points; creating a new frame, the new frame corresponding to the pose and being associated with a set of new data points of the plurality of new data points; selecting one or more target frames from the preliminary frame and the new frame; and generating the updated localizer map based on the one or more target frames and the associated sets of preliminary data points or new data points.

In Example 2, the subject matter of Example 1 includes, determining that a count of the selected one or more target frames exceeds a maximum number of frames; and purging a target frame from the one or more selected target frames such that the count of the selected target frames after purging is less than or equal to the maximum number of frames.

In Example 3, the subject matter of Examples 1-2 includes, wherein the selecting the one or more target frames from the preliminary frame and the new frame comprises: randomly selecting the one or more target frames from the preliminary frame and the new frame.

In Example 4, the subject matter of Examples 1-3 includes, wherein the selecting the one or more target frames from the preliminary frame and the new frame comprises: determining a timestamp corresponding to each of the preliminary frame; removing an old preliminary frame from the preliminary frame to generate one or more remaining preliminary frames, wherein the timestamp of the old frame is earlier than a preset time point; and selecting the one or more target frames from the one or more remaining preliminary frames and the new frame.

In Example 5, the subject matter of Examples 1-4 includes, wherein the selecting the one or more target frames from the preliminary frame and the new frame comprises: clustering the preliminary frame and the new frame to generate one or more target clusters; and selecting a target frame from each of the one or more target clusters as the one or more target frames.

In Example 6, the subject matter of Example 5 includes, determining an isolated target cluster from the one or more target clusters, wherein a count of frames in the isolated target cluster is less than a threshold; removing the isolated target cluster from the one or more target clusters to generate a remaining target cluster; and selecting the target frame from each of the remaining target cluster as the one or more target frames.

In Example 7, the subject matter of Examples 1-6 includes, wherein the selecting the one or more target frames from the preliminary frame and the new frame comprises: determining a quality index for each of the preliminary frame and each of the new frame; and selecting the one or more target frames from the preliminary frame and the new frame based on the quality index.

In Example 8, the subject matter of Examples 1-7 includes, wherein the selecting the one or more target frames from the preliminary frame and the new frame comprises: displaying a visual representation related to the preliminary frame and the new frame on a graphical user interface (GUI) of a user device; receiving a selecting operation on the GUI from a user; and selecting the one or more target frames based on the selecting operation from the user.

In Example 9, the subject matter of Examples 1-8 includes, acquiring a 3D data representation of the reference scene; and generating a 3D model of the reference scene based on the 3D data representation of the reference scene and the updated localizer map.

In Example 10, the subject matter of Example 9 includes, D data representation of the reference scene and the updated localizer map further comprises: aligning the updated localizer map with the 3D data representation;

and generating the 3D model of the reference scene based on the aligned updated localizer map and the 3D data representation.

In Example 11, the subject matter of Example 10 includes, D data representation comprises: aligning the preliminary localizer map with the 3D data representation; and transforming the new frame from a new coordinate system to an old coordinate system, wherein the old coordinate system corresponds to the preliminary frame.

In Example 12, the subject matter of Examples 1-11 includes, wherein the determining the pose of the capture device related to the capture of the plurality of new data points comprises: recording, using a record device, the pose of the capture device.

In Example 13, the subject matter of Examples 1-12 includes, wherein the determining the pose of the capture device related to the capture of the plurality of new data points comprises: implementing the preliminary localizer map to determine the pose of the capture device based on the plurality of new data points.

Example 14 is a computing apparatus comprising: a processor; and a memory storing instructions that, when executed by the processor, configure the apparatus to: acquire a preliminary localizer map of a reference scene, the preliminary localizer map including a preliminary frame that each is associated with a set of preliminary data points; capture, using a capture device, a plurality of new data points on the reference scene; determine a pose of the capture device related to the capture of the plurality of new data points; create a new frame, each of the new frame corresponding to one of the pose and being associated with a set of new data points of the plurality of new data points; select one or more target frames from the preliminary frame and the new frame; and generate an updated localizer map based on the one or more target frames and the associated sets of preliminary data points or new data points.

In Example 15, the subject matter of Example 14 includes, wherein the instructions further configure the apparatus to: determine that a count of the selected one or more target frames exceeds a maximum number of frames; and purge a target frame from the one or more selected target frames such that the count of the selected target frames after purging is less than or equal to the maximum number of frames.

In Example 16, the subject matter of Examples 14-15 includes, wherein to select the one or more target frames from the preliminary frame and the new frame, the instructions configure the apparatus to: determine a timestamp corresponding to each of the preliminary frame; remove an old preliminary frame from the preliminary frame to generate one or more remaining preliminary frames, wherein the timestamp of the old frame is earlier than a preset time point; and select the one or more target frames from the one or more remaining preliminary frames and the new frame.

In Example 17, the subject matter of Example 16 includes, wherein the instructions further configure the apparatus to: acquire a 3D data representation of the reference scene; and generate a 3D model of the reference scene based on the 3D data representation of the reference scene and the updated localizer map.

In Example 18, the subject matter of Example 17 includes, D data representation of the reference scene and the updated localizer map, the instructions further configure the apparatus to: align the updated localizer map with the 3D data representation; and generate the 3D model of the reference scene based on the aligned updated localizer map and the 3D data representation.

In Example 19, the subject matter of Example 18 includes, D data representation, the instructions configure the apparatus to: align the preliminary localizer map with the 3D data representation; and transform the new frame from a new coordinate system to an old coordinate system, wherein the old coordinate system corresponds to the preliminary frame.

Example 20 is a non-transitory computer-readable storage medium, the computer-readable storage medium including instructions that when executed by a computer, cause the computer to: acquire a preliminary localizer map of a reference scene, the preliminary localizer map including a preliminary frame that each is associated with a set of preliminary data points; capture, using a capture device, a plurality of new data points on the reference scene; determine a pose of the capture device related to the capture of the plurality of new data points; create a new frame, each of the new frame corresponding to one of the pose and being associated with a set of new data points of the plurality of new data points; select one or more target frames from the preliminary frame and the new frame; and generate an updated localizer map based on the one or more target frames and the associated sets of preliminary data points or new data points.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Glossary

"Localizer map" may refer to a map used for localization and tracking. Examples of a localizer map may include a sparse map, a dense map, a point cloud map.

"CV model" may refer to a computer vision model. Examples of a CV model may include a Simultaneous Localization and Mapping (SLAM) model, a Visual Inertial Odometry (VIO) model, a Structure from Motion (SfM) model.

"3D data representation" may refer to a 3D representation of an object or environment. Examples of a 3D data representation may include a 3D mesh, a point cloud, a depth map.

"Reference scene" may refer to a scene including an object, surface or environment. Examples of a reference scene may include a room, a building facade, a landmark.

"Capture device" may refer to a device to capture data. Examples of a capture device may include a camera (RGB, RGB-D, stereo), a 3D scanner.

"Pose" may refer to the position and orientation of a capture device. Examples of a pose may include translation and rotation parameters.

"Frame" may refer to data captured at a point in time. Examples of a frame may include an image frame, a point cloud frame.

"Component" may refer to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" may refer to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" may refer to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" may refer to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" may refer to a tangible medium that is capable of storing, encoding, or carrying the instructions for execution by a machine.

"Signal medium" may refer to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method to generate an updated localizer map of a reference scene, the method comprising:

acquiring a preliminary localizer map of the reference scene, the preliminary localizer map including a preliminary frame that each is associated with a set of preliminary data points;

capturing, using a capture device, a plurality of new data points on the reference scene;

determining a pose of the capture device related to the capture of the plurality of new data points;

creating a new frame, the new frame corresponding to the pose and being associated with a set of new data points of the plurality of new data points;

selecting one or more target frames from the preliminary frame and the new frame;

generating the updated localizer map based on the one or more target frames and the associated sets of preliminary data points or new data points;

acquiring a 3D data representation of the reference scene;

aligning the preliminary localizer map with the 3D data representation of the reference scene;

transforming the new frame from a new coordinate system to an old coordinate system corresponding to the preliminary frame, to align the 3D data representation with the updated localizer map; and generating a 3D model of the reference scene based on the aligned updated localizer map and the 3D data representation.

2. The method of claim 1, further comprising:

determining that a count of the selected one or more target frames exceeds a maximum number of frames; and purging a target frame from the one or more selected target frames such that the count of the selected target frames after purging is less than or equal to the maximum number of frames.

3. The method of claim 1, wherein the selecting the one or more target frames from the preliminary frame and the new frame comprises:

randomly selecting the one or more target frames from the preliminary frame and the new frame.

4. The method of claim 1, wherein the selecting the one or more target frames from the preliminary frame and the new frame comprises:

determining a timestamp corresponding to each of the preliminary frame;

removing an old preliminary frame from the preliminary frame to generate one or more remaining preliminary frames, wherein the timestamp of the old frame is earlier than a preset time point; and selecting the one or more target frames from the one or more remaining preliminary frames and the new frame.

5. The method of claim 1, wherein the selecting the one or more target frames from the preliminary frame and the new frame comprises:

clustering the preliminary frame and the new frame to generate one or more target clusters; and selecting a target frame from each of the one or more target clusters as the one or more target frames.

6. The method of claim 5, further comprising:

determining an isolated target cluster from the one or more target clusters, wherein a count of frames in the isolated target cluster is less than a threshold;

removing the isolated target cluster from the one or more target clusters to generate a remaining target cluster; and selecting the target frame from each of the remaining target cluster as the one or more target frames.

7. The method of claim 1, wherein the selecting the one or more target frames from the preliminary frame and the new frame comprises:

determining a quality index for each of the preliminary frame and each of the new frame; and selecting the one or more target frames from the preliminary frame and the new frame based on the quality index.

8. The method of claim 1, wherein the selecting the one or more target frames from the preliminary frame and the new frame comprises:

displaying a visual representation related to the preliminary frame and the new frame on a graphical user interface (GUI) of a user device;

receiving a selecting operation on the GUI from a user; and selecting the one or more target frames based on the selecting operation from the user.

9. The method of claim 1, wherein the determining the pose of the capture device related to the capture of the plurality of new data points comprises:

recording, using a record device, the pose of the capture device.

10. The method of claim 1, wherein the determining the pose of the capture device related to the capture of the plurality of new data points comprises:

implementing the preliminary localizer map to determine the pose of the capture device based on the plurality of new data points.

11. A computing apparatus comprising:

a processor; and a memory storing instructions that, when executed by the processor, configure the apparatus to:

acquire a preliminary localizer map of a reference scene, the preliminary localizer map including a preliminary frame that each is associated with a set of preliminary data points;

capture, using a capture device, a plurality of new data points on the reference scene;

determine a pose of the capture device related to the capture of the plurality of new data points;

create a new frame, each of the new frame corresponding to one of the pose and being associated with a set of new data points of the plurality of new data points;

select one or more target frames from the preliminary frame and the new frame; and generate an updated localizer map based on the one or more target frames and the associated sets of preliminary data points or new data points;

acquire a 3D data representation of the reference scene;

align the preliminary localizer map with the 3D data representation of the reference scene;

transform the new frame from a new coordinate system to an old coordinate system corresponding to the preliminary frame, to align the 3D data representation with the updated localizer map; and generate a 3D model of the reference scene based on the aligned updated localizer map and the 3D data representation.

12. The computing apparatus of claim 11, wherein the instructions further configure the apparatus to:

determine that a count of the selected one or more target frames exceeds a maximum number of frames; and purge a target frame from the one or more selected target frames such that the count of the selected target frames after purging is less than or equal to the maximum number of frames.

13. The computing apparatus of claim 11, wherein to select the one or more target frames from the preliminary frame and the new frame, the instructions configure the apparatus to:

determine a timestamp corresponding to each of the preliminary frame;

remove an old preliminary frame from the preliminary frame to generate one or more remaining preliminary frames, wherein the timestamp of the old frame is earlier than a preset time point; and select the one or more target frames from the one or more remaining preliminary frames and the new frame.

14. A non-transitory computer-readable storage medium, the non-transitory computer-readable storage medium including instructions that when executed by a computer, cause the computer to:

acquire a preliminary localizer map of a reference scene, the preliminary localizer map including a preliminary frame that each is associated with a set of preliminary data points;

capture, using a capture device, a plurality of new data points on the reference scene;

determine a pose of the capture device related to the capture of the plurality of new data points;

create a new frame, each of the new frame corresponding to one of the pose and being associated with a set of new data points of the plurality of new data points;

select one or more target frames from the preliminary frame and the new frame; and generate an updated localizer map based on the one or more target frames and the associated sets of preliminary data points or new data points, acquire a 3D data representation of the reference scene;

align the preliminary localizer map with the 3D data representation of the reference scene;

transform the new frame from a new coordinate system to an old coordinate system corresponding to the preliminary frame, to align the 3D data representation with the updated localizer map; and generate a 3D model of the reference scene based on the aligned updated localizer map and the 3D data representation.

* * * * *